(12) United States Patent
Yan et al.

(10) Patent No.: US 7,759,401 B2
(45) Date of Patent: Jul. 20, 2010

(54) NANOPOROUS AND MICROPOROUS SOLVOGELS AND NANOLATEXES BY MICROEMULSION POLYMERIZATION

(75) Inventors: Feng Yan, Suzhou (CN); John Texter, Ypsilanti, MI (US)

(73) Assignee: Eastern Michigan University, Ypsilanti, MI (US)

( * ) Notice: Subject to any disclaimer, the term of this patent is extended or adjusted under 35 U.S.C. 154(b) by 390 days.

(21) Appl. No.: 11/689,866

(22) Filed: Mar. 22, 2007

(65) Prior Publication Data

US 2009/0176915 A1 Jul. 9, 2009

Related U.S. Application Data

(60) Provisional application No. 60/784,666, filed on Mar. 22, 2006, provisional application No. 60/898,338, filed on Jan. 30, 2007.

(51) Int. Cl.
| | |
|---|---|
| *C09K 3/00* | (2006.01) |
| *B01D 21/01* | (2006.01) |
| *B01J 13/00* | (2006.01) |
| *C08J 3/02* | (2006.01) |
| *C08K 7/16* | (2006.01) |
| *C08C 1/08* | (2006.01) |
| *C07D 233/00* | (2006.01) |

(52) U.S. Cl. .................. 516/68; 516/102; 526/258; 526/263; 523/223; 523/335; 548/347.1

(58) Field of Classification Search ............... 526/220; 516/68, 102; 523/223, 335; 548/347.1
See application file for complete search history.

(56) References Cited

U.S. PATENT DOCUMENTS 5,234,807 A * 8/1993 Texter et al. .............. 430/627

5,238,992 A * 8/1993 Outubuddin ............... 524/710
6,573,405 B1 6/2003 Abbott et al.

(Continued)

FOREIGN PATENT DOCUMENTS

WO 2006/026064 3/2006

(Continued)

OTHER PUBLICATIONS

Washiro, S., Yoshizawa, M., Nakajima, H., Ohno, H. "Highly ion conductive flexible films composed of network polymers based on polymerizable ionic liquids." Polymer, vol. 45, p. 1577-1582, 2004.*

(Continued)

*Primary Examiner*—Vasu Jagannathan
*Assistant Examiner*—Anthony H Sheh
(74) *Attorney, Agent, or Firm*—Michael Best & Friedrich LLP

(57) ABSTRACT

The present invention relates to microemulsions of immiscible fluids stabilized by reactive ionic liquid surfactant wherein the ionic liquid surfactant has a melting point less than 80° C. The invention also relates to composite materials comprising a copolymer of ethylenically reactive species, wherein one of the species is a reactive ionic liquid surfactant having a melting point less than 80° C., and wherein the material also comprises non-reactive Class I fluid. The invention further relates to methods for synthesizing the composite materials comprising preparing a microemulsion of immiscible Class I fluid and Class II fluid stabilized by reactive ionic liquid surfactant wherein the ionic liquid surfactant has a melting point less than 80° C., and polymerizing the microemulsion to form a composite material.

63 Claims, 17 Drawing Sheets

U.S. PATENT DOCUMENTS

2007/0293684 A1* 12/2007 Fudemoto et al. ......... 548/335.1
2009/0060859 A1* 3/2009 Garcia Castro et al. .. 424/70.15

OTHER PUBLICATIONS

Chow, P.Y., Gan, L.M. "Microemulsion Polymerizations and Reactions." Advanced Polymer Science, vol. 175, p. 257-298, 2005.*

Yu, S., Yan, F., Zhang, X., You, J., Wu, P., Lu, J., Xu, Q., Xia, X., Ma, G. Macromolecules, vol. 41, p. 3389-3392, 2008.*

Bradley, A.E. et al., "Small-angle x-ray scattering studies of liquid crystalline 1-alkyl-3-methylimidazolium salts," Chem. Mater. (2002) 14:629-635.

Ding, S. et al., "Ionic liquid catalyst for biphasic atom transfer radical polymerization of methyl methacrylate," Macromolecules (2005) 38:5921-5928.

Eastoe, J. et al., "Ionic liquid-in-oil microemulsions," J. Am. Chem. Soc. (2005) 127:7302-7303.

Gao, H. et al., "Microemulsions with ionic liquid polar domains," Phys. Chem. Chem. Phys. (2004) 6:2914-2916.

Gao, Y. et al., "TX-100/water/1-butyl-3-methylimidazolium hexafluorophosphate microemulsions," Langmuir (2005) 21:5681-5684.

Hoffmann, M.M. et al., "Surfactants in green solvent systems—current and future research directions," J. Dispersion Sci. and Tech. (2003) 24(2):155-171.

Jain, N. et al., "Chemical and biochemical transformations in ionic liquids," Tetrahedron (2005) 61:1015-1060.

Joynes, D. et al., "Novel polymerizable mono- and divalent quaternary ammonium cationic surfactants: I. Synthesis, structural characterization and homopolymerization," Polymer (1996) 37(8):1453-1462.

Li et al., "Complex formulation of ionic liquid surfactant and beta-cyclodextrin," Colloids and Surfaces A: Physicochem. Eng. Aspects (2007) 292:196-201.

Modaressi, A. et al., "Influence of the molecular structure on the aggregation of imidazoium ionic liquids in aqueous solutions," Colloids and Surfaces A: Physicochemical and Eng. Aspects (2007) 21 pages.

Sirieix-Plenet, J. et al., "Behaviour of binary solvent mixture constituted by an amphiphilic ionic liquid, 1-decyl-3-methylimidazolium bromide and water potentiometric and conductimetric studies," Telanta (2004) 63:979-986.

Washiro, S. et al., "Highly ion conductive flexible films composed of network polymers based on polymerizable ionic liquids," Polymer (2004) 45:1577-1582.

Xia, H. et al., "Physicochemical features of ionic liquid solutions in the phase separation of penicillin(II): winsor II reversed micelle," Am. Chem. Soc., Published on the Web Feb. 21, 2007, 5 pages.

Yan, F. et al., "Surfactant ionic liquid-based microemulsions for polymerization," Chem. Commun. (2006) 2696-2698.

Yan, P. et al., "Two cloud-point phenomena in tetrabutylammonium perfluorooctanoate aqueous solutions: anomalous temperature-induced phase and structure transitions," J. Phys. Chem. B (2005) 109:5237-5242.

Yoshizawa, M. et al., "Synthesis of molten salt-type polymer brush and effect of brush structure on the ionic conductivity," Electrochimica Acta (2001) 46:1723-1728.

* cited by examiner

NANOPOROUS AND MICROPOROUS SOLVOGELS AND NANOLATEXES BY MICROEMULSION POLYMERIZATION

CROSS REFERENCE TO RELATED APPLICATIONS

This application claims priority to U.S. Provisional Application Ser. No. 60/784,666, filed Mar. 22, 2006, and to U.S. Provisional Application Ser. No. 60/898,338, filed Jan. 30, 2007. The entire texts of the above-referenced disclosures are hereby incorporated by reference.

INTRODUCTION

This invention relates to creating new polymers for new composite materials from polymerizable microemulsions by microemulsion bulk polymerization. The polymerizable microemulsions are stabilized by reactive ionic liquid surfactants. The new materials include latexes, gels, nanoporous solids, microporous solids, antimicrobial membranes, filter materials, tissue scaffolds, chemical delivery carriers, fire resistant foams, and templated composites including microporous metal oxides and metals.

Ionic Liquids

U.S. Pat. No. 5,827,602, incorporated herein by reference, describes the use of ionic liquids from the group consisting of pyridinium, pyridazinium, pyrimidinium, pyrazinium, imidazolium, pyrazolium, thiazolium, oxazolium and triazolium salts in electrochemical cells.

Abbott and Davies, in U.S. Pat. No. 6,573,405, incorporated herein by reference, disclose an ionic liquid having a melting point of no more than 60° C., formed by the reaction of a quaternary ammonium compound of the formula:

$$R^1R^2R_2R^4N^+X^-$$

or a mixture of two or more thereof; with a halide of zinc, tin or iron, or a mixture of two or more thereof.

Shen and Radosz, in PTO Pat. Doc. No. WO2006/026064 A3, incorporated herein by reference, disclose polymerizable ionic liquid monomers and their corresponding polymers (poly(ionic liquid)s) are created and found to exhibit high $CO_2$ sorption. The poly(ionic liquid)s have enhanced and reproducible $CO_2$ sorption capacities and sorption/desorption rates relative to room-temp. ionic liquids. These materials exhibit selectivity relative to other gases such as nitrogen, methane, and oxygen. They are useful as efficient separation agents, such as sorbents and membranes. New radical and condensation polymerization approaches are used in the preparation of the poly(ionic liquid)s. Thus, 0.064 mol p-vinylbenzyl chloride and 0.064 mol 1-methylimidazole were reacted at 45° overnight, 0.47 mol sodium tetraborate was added therein to give a 1-(p-vinylbenzyl)-3-methyl-imidazolium tetrafluoroborate, which was polymerized using AIBN to give a polyionic liquid, showing good $CO_2$ absorption.

Jain et al. (in Tetrahedron, 2005, 61, 1015-1060, incorporated herein by reference) review chemical and biochemical transformations in ionic liquids, and in particular they review the synthesis of ammonium cation-based, non-functionalized imidazolium, functionalized imidazolium and chiral ionic liquids on pp. 1017-1022 therein.

Ionic Liquids in Microemulsions. Ionic liquids have been formulated as water immiscible fluids in microemulsions stabilized by various conventional surfactants. Friberg et al. (J. Dispersion Sci. Technol. 2000, 21, 185-197) have reported microemulsions of water and 1-butyl-3-methyl imidazolium hexafluorphosphate stabilized by the nonionic surfactant Laureth 4 [nominally $C_{12}(EO)_4$]. Gao et al. (Langmuir, 2005, 5681-5684) report the partial phase diagram, including microemulsion domain, for the ternary water and 1-butyl-3-methyl imidazolium hexafluorophosphate system stabilized by Triton X-100 surfactant. Eastoe et al. (J. Am. Chem. Soc. 2005, 127, 7302-7303) describe phase behavior of microemulsion formulated with the immiscible fluids cyclohexane-$d_{12}$ and (the ionic liquid) 1-butyl-3-methylimidazolium tetrafluoroborate ([bmim] [BF4]) stabilized by Triton X-100 surfactant.

Ionic Liquid Surfactants

Ionic liquid surfactants are ionic liquids that also are surfactants. Surfactants are surface active molecules that preferentially aggregate at immiscible fluid interfaces and preferentially lower the higher surface energy fluid surface tension. Ionic liquid surfactants are known. Li et al. (Coll. Surfaces A, 2007, 292, 196-201) have recently disclosed the ionic liquid surfactant 1-dodecyl-3-methyl-imidazolium hexafluorophosphate:

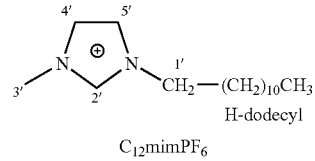

$C_{12}mimPF_6$

Sirieiex-Plénet et al. (Talanta 2004, 63, 979-986) have disclosed the ionic liquid surfactant 1-decyl-3-methyl-imidazolium bromide. Modaressi et al. (COLSUA 14398; doi: 10.1016/j.colsurfa.2007.02.020) have disclosed the ionic liquid surfactants 1-decyl-3-methyl-imidazolium chloride ([$C_{10}$mim][Cl]) and 1-dodecyl-3-methylimidazolium chloride ([$C_{12}$mim][Cl]) and have reported on the aggregation properties of these ionic liquid surfactants in water. Firestone et al. (Langmuir, 2002, 18, 7258-7260) have reported on the liquid crystalline gel properties of 1-decyl-3-methyl-imidazolium bromide. Ionic liquid exhibiting smectic mesophases have been disclosed by Bowlas et al. (Chem. Comm. 1996, 1625-1626). Holbrey and Seddon have disclosed (J. Chem. Soc. Dalton Trans. 1999, 2133-2139) 1-alkyl-3-methylimidazolium tetrafluoroborate with the general formula [Cn-mim][BF4] (n=0-18) where distinct surfactant activity is obtained for n>5. Bradley et al (*Chem. Mater.* 2002, 14, 629-635) disclose the ionic liquid surfactants 1-alkyl-3-methylimidazolium salts ([Cn-mim]X, n=12-18) containing the anions X⁻ consisting of chloride, bromide, trifluoromethanesulfonate (OTf), and bis(trifluoromethanesulfonyl)imide (TFI). Merrigan et al. (Chem. Comm. 2002, 2051-2052) have disclosed ionic liquid surfactants based upon imidazolium cations with fluorous tails. Xia et al. (Ind. Eng. Chem. Res. 2007 ASAP article, DOI: 10.1021/ie060606h) report and characterize the partitioning and extraction of penicillin in aqueous reverse micelles in cyclohexane, isooctane, and decane for the ionic liquid surfactants 1-dodecyl-3-methyl imidazolium chloride [$C_{12}$mim]Cl, 1-tetradecyl-3-methyl imidazolium chloride,

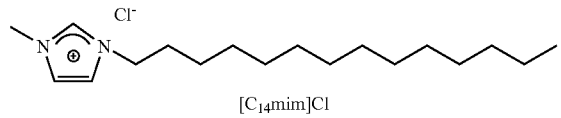

[$C_{14}$mim]Cl and 1-tetradecyl-2,3-dimethyl imidazolium chloride:

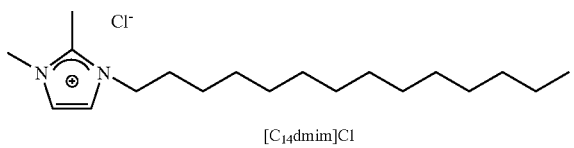

[C₁₄dmim]Cl

Ionic Liquids Technologies GmbH & Co. KG of Denzlingen, Germany disclose the following ionic liquid surfactants in their catalog of Mar. 1, 2007: 1-decyl-3-methylimidalzolium hexafluorophosphate, 1-decyl-3-methylimidalzolium triflate, 1,3-didecyl-2-methylimidalzolium chloride, 1-hexyl-3-methylimidalzolium bromide, 1-hexyl-3-methylimidalzolium chloride, 1-hexyl-3-methyl imidazolium tetrafluoroborate, 1-hexyl-3-methyl imidazolium triflate, 1-hexyl-3-methy imidazolium hexafluorophosphate, 1-hexyl-3-methylimidalzolium iodide, 1-methyl-3-octylimidalzolium bromide, 1-methyl-3-octylimidazolium hexafluorophosphate, 1-methyl-3-octylimidalzolium chloride, 1-methyl-3-octylimidalzolium triflate, tributyltetradecylphosphonium chloride, tributyltetradecylphosphonium dodecansulfonate, tetraoctylphosphonium bromide, trihexyltetradecylphosphonium bis(2,4,4-trimethylpentyl)phosphinate, trihexyltetradecylphosphonium bromide, trihexyltetradecylphosphonium chloride, trihexyltetradecylphosphonium hexafluorophosphate, trihexyltetradecylphosphonium dodecanoate, and trihexyltetradecylphosphonium dicyanamide.

Sigma-Aldrich Company (St. Louis, Mo. 63178), in their on-line (http://www.sigmaaldrich.com/) catalog disclose the following ionic liquid surfactants: 1-methyl-3-(1H,1H,2H,2H-perfluorooctyl)imidazolium hexafluorophosphate, 1-butyl-3-(1H,1H,2H,2H-perfluorooctyl)imidazolium hexafluorophosphate, 1-butyl-3-methylimidazolium octylsulfate, trioctylmethylammonium thiosalicylate, tetrabutylammonium perfluorooctanesulfonate, tetradecyltrihexylphosphonium bis(trifluoromethylsulfonyl)amide, and tetrahexylammonium nitrate.

Cochin et al. (*Macromolecules* 1993, 26, 5755-5764) disclose the synthesis of alkyldimethylvinybenzyl chloride reactive surfactants of the structure

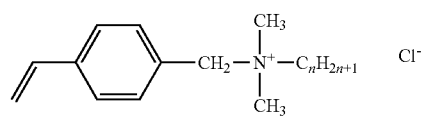

for alkyl groups having n=8, 12, and 6. The chain radical polymerization of these compounds in aqueous micelles is disclosed.

Joynes and Sherrington (Polymer 1996, 37, 1453-1462) disclose the synthesis of the following divalent cationic surfactants:

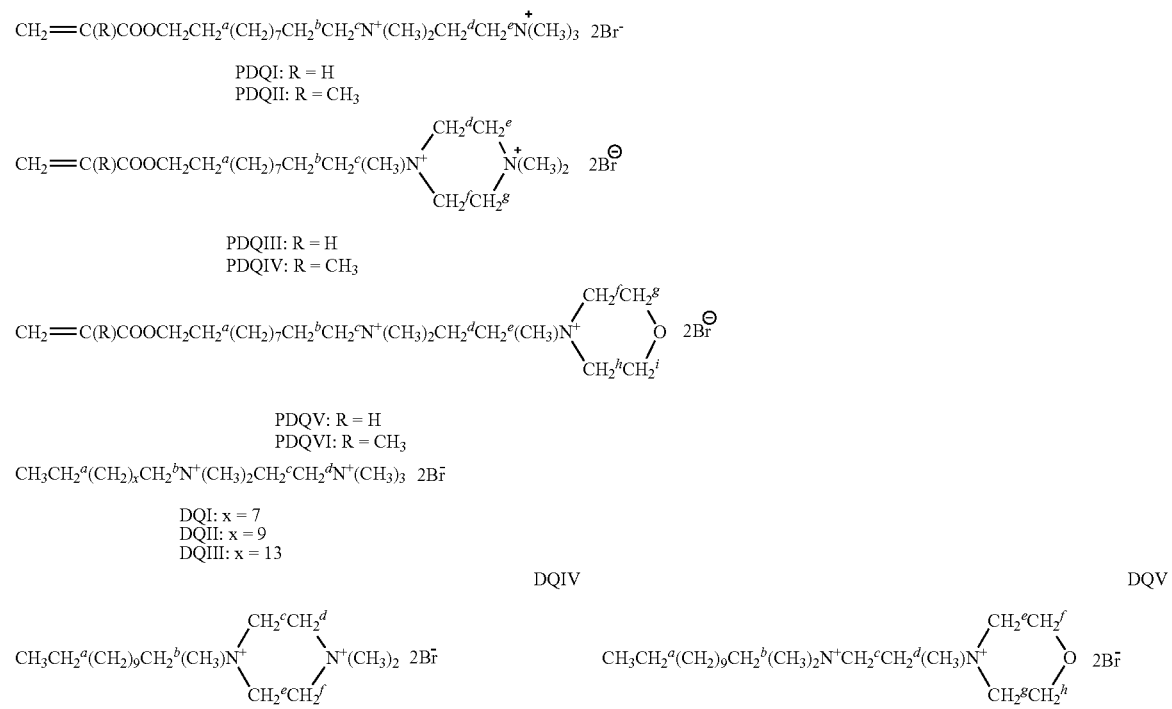

The details of this reference are included by reference for all they teach about surfactant synthesis. Most of the examples have melting points too high to make them useful as ionic liquid surfactants in the present invention.

Yan et al. (J. Phys. Chem. B 2005, 109, 5237-5242) report aspects of the phase and micellar behavior of the ionic liquid surfactant tetrabutylammonium perfluorooctanoate.

Kato et al., in U.S. Pat. No. 7,166,238, disclose a novel liquid-crystalline ionic conductor, which is useful in the electric, electronic, chemical and bioengineering fields, as an anisotropic reaction solvent, ionic conductor, electric field-responsible conductor or the like, and a method for producing the same, is provided. The liquid-crystalline ionic conductor is obtained by mixing an organic molten salt with a-liquid-crystalline organic molecule or a liquid-crystalline inorganic molecule, which comprises a moiety miscible to the organic molten salt and a moiety that shows liquid-crystalline orientation, thereby forming a liquid-crystalline ionic conductor, wherein the organic molten salt is assembled to the liquid-crystalline molecule.

Ding et al. (in Macromolecules 2005, 38, 5921-5928) disclose the following ionic liquid that is reactive [1-(2-acryloyloxyethyl)-3-butylimidazolium tetrafluoroborate]:

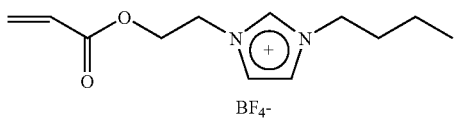

Yoshikawa and Ohno (in Electrochimical Acta, 2001, 46, 1723-1728, incorporated herein by reference for all that it teaches) disclose reactive ionic liquid surfactants based on the imidazolium cation with ethylene oxide spacing between the cation and the acryloyl group

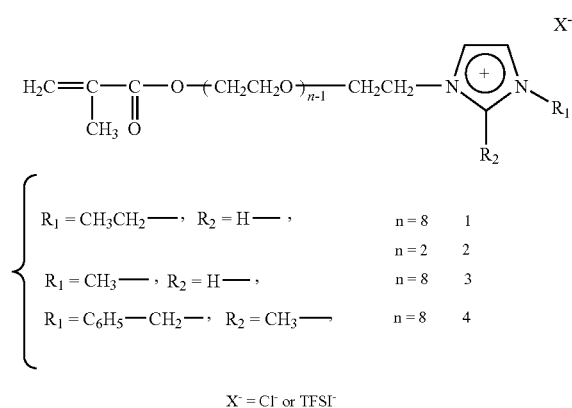

and with hydrocarbon spacing between the cation and the acryloyl group:

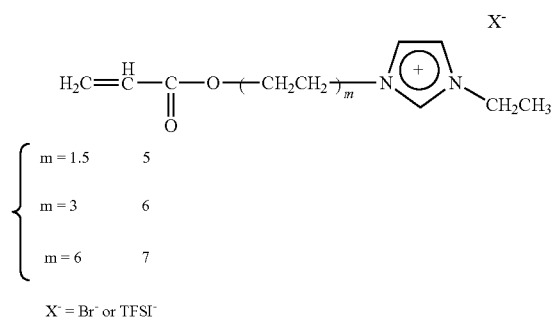

These reactive ionic liquid surfactants were homopolymerized using AIBN (1 mol % as initiator at 60° C. in ethanol under a nitrogen atmosphere. When the counter anion species of the polymer was TFSI⁻(bis[trifluoromethanesulfonyl] imide), molten salt polymer (1) was obtained as a rubber-like solid. It however showed high ionic conductivity ($1.49 \times 10^{-4}$ S/cm at 30° C.) corresponding to that of monomers reflecting a low $T_g$ (−56° C.). The PEO-tethering of molten salt with the polymer matrix was effective in suppressing the drop of ionic conductivity after polymerization. The ionic conductivity of molten-salt polymers increased with increasing EO or ethylene unit number.

Washiro et al. (in Polymer 2004, 45, 1577-1582 and incorporated herein by reference) disclose reactive ionic liquid surfactants based on substituted imidazolium having the structures:

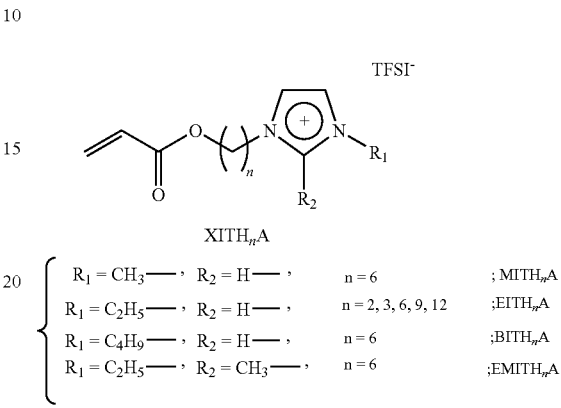

These reactive surfactants were polymerized with cross-linkers having the structures:

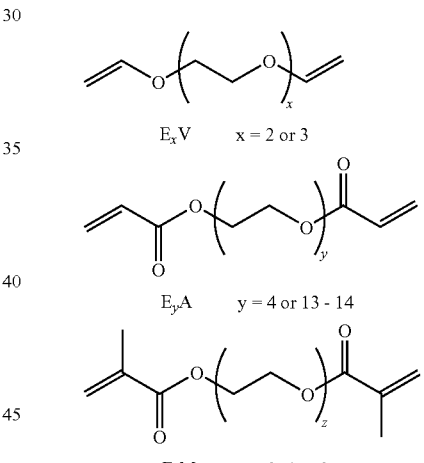

These reactive ionic liquid surfactants were copolymerized with these cross-linking agents under nitrogen at 70° C. for 8 h using AIBN as initiator and at 1 mol % of acryl units.

Microemulsions

Microemulsions are transparent and thermodynamically stable dispersions containing two immiscible liquids, and at least a third chemical component, typically a surfactant (J. H. Schulman, E. G. Cocknain, *Trans. Faraday Soc.,* 1940, 36, 661; T. P. Hoar, J. H. Schulman, *Nature,* 1943, 152, 102). A micellar solution composed of a surfactant and a single solvent of any type in which the surfactant is soluble and exhibits the formation of micelles is a special limiting case of a microemulsion. A transparent microemulsion is homogenous at a macroscopic level, however, it is heterogeneous at molecular and supramolecular scales. Microemulsions can be in the form of either droplet microemulsions (oil-in-water, o/w, and water-in-oil, w/o) or bicontinuous microemulsions. Radii of the nanodroplets are usually on the order of 1-10 nm. In case of bicontinuous microemulsions, both the aqueous and oil pseudophases are continuous. The equilibrium domain lengths normally range from about 1-10 nm (e.g. tubule diameter) to 5-100 nm (tubule length). Since light is only weakly scattered, therefore, microemulsions are optically isotropic and usually appear to be transparent [J. E. Bowcott, J. H. Schulman, Z. *Elektrochem.*, 1955, 59, 283; J. H. Schulman, W. Stoekenius, L. M. Prince, *J. Phys. Chem.*, 1959, 63, 1677]. It is also possible to undergo structural transitions from an oil-in-water to a water-in-oil microstructured dispersion without any apparent discontinuity by varying intensive (field) variables such as temperature or water volume fraction (L. E. Scriven, *Nature*, 1976, 263, 123; W. R. Burghardt, K. Krishnan, F. S. Bates, T. P. Lodge, *Macromolecules*, 2002, 35, 4210; S. Burauer, L. Belkoura, C. Stubenrauch, R. Strey, *Colloids Surf.: Phys. Eng. Aspects*, 2003, 228, 159).

The use of microemulsions to prepare oil-in-water dispersions of water insoluble components has been described by Rosano (U.S. Pat. No. 4,146,499). The general features of microemulsion polymerization have been reviewed by Dunn (Polymerization in Micelles and Microemulsions, In *Comprehensive Polymer Science. The Synthesis, Characterization, Reactions and Applications of Polymers*, Vol. 4, Chain Polymerization II, Eastmond, Ledwith, Russo, and Sigwalt, Editors, Pergamon, 1989, pp. 219-224) and by Candau (J. Chim. Phys. Phys.-Chim. Biol., 1987). Stoffer and Bone disclose (J. Disp. Sci. Technol., 1980, 1, 37; J. Polym. Sci.: Polym. Chem., 1980, 18, 2641) the polymerization of methylmethacrylate in water-in-oil microemulsions. Leong et al. (J. Chim. Phys. Phys.-Chim. Biol., 1981, 78, 279) disclose the polymerization of acrylamide in water-in-toluene microemulsions stabilized by triblock copolymers of polystyrene and polytheylene oxide in the presence of 2-propanol to obtain microlatexes.

A characteristic feature of microemulsions is that there exist a rich diversity of supramolecular domains of surfactant (amphiphile) aggregates defining the water/oil interface (J. L. Salager, *Microemulsions*, in: U. Zoller, G. Broze (Eds.), Handbook of Detergents: Part A-Properties, Dekker, New York, 1999 (Chapter 8); D. O, Shah (Ed.), *Micelles, Microemulsions and Monolayers: Science and Technology*, Dekker, New York, 1998). In addition to oil-swollen micelles and water-swollen reverse micelles, the zoology of aggregate structures also includes clusters of micelles, "percolating" clusters of micelles (A.-M. Cazabat, D. Chatenay, D. Langevin, J. Meunnier, *Faraday Disc. Chem. Soc.*, 1982, 76, 291), irregular bicontinuous microstructure of interpenetrating oil and water domains (L. E. Scriven, *Nature*, 1976, 263, 123), and so-called sponge phase structures (D. Anderson, H. Wennerstrôm, U. Olsson, *J. Phys. Chem.*, 1989, 93, 4243). The formation of these amphiphile aggregates is governed by self-assembly association of the amphiphile monomer structure, concentration, temperature, and pressure as well as by how the surfactant interacts with each of the immiscible fluids it separates. These microstructural aggregates are in motion; they collide, fuse and break apart. The dynamic properties of such supramolecular aggregates and characterizations of supramolecular equilibria in microemulsions have been recently discussed (J. Texter, *Colloids Surf. A*, 2000, 167, 115). The variety of these supramolecular structures in microemulsions offers novel reaction media for the synthesis of materials grown at nanometer to supramolecular length scales.

Microemulsion Polymerization

Atik and Thomas disclose (J. Am. Chem. Soc., 104, 5868, 1982; 105, 4515, 1983) the microemulsion polymerization of styrene and divinylbenzene mixtures. Leong and Candau disclose (J. Phys. Chem., 86, 2269, 1982) the ultraviolet initiated microemulsion polymerization of acrylamide in inverse microemulsions. Candau et al. disclose (German Offen. 3312711) the preparation of latexes, useful in secondary oil recovery, from water-in-oil microemulsions of water-soluble vinyl monomers. Daniel (Fr. Demande 2528436 A1) discloses the preparation of polymeric latexes for biological use by coating acrylic latexes with vinylaromatic polymers. Gan et al. (J. Macromol. Sci., Chem., A19, 739, 1983) disclose the polymerization of styrene in microemulsions comprising styrene, water, sodium dodecyl sulfate, pentanol or Bu Cellosolve (CAS Registry # 11 1-76-2).

Bock et al. disclose (European Pat. No. 115213 A) the preparation of acrylamide and alkylacrylamide copolmers by microemulsion polymerization. Tang et al. disclose (Polymer, 1984) the microemulsion polymerization of styrene in sodium dodecylsulfate, pentanol, and water microemulsions. The effects of water-soluble and oil-soluble free radical initiators on latex particle size in microemulsion polymerization have been disclosed by Johnson and Gulari (J. Polym. Sci.: Polym. Chem., 22, 3967, 1984). Jayakrishnan and Shah disclose (J. Polym. Sci.: Polym. Letters, 22, 31, 1984) the microemulsion polymerization of styrene using Aerosol MA-80 and Pluronic L-31 surfactants. Candau et al. disclose (J. Colloid Interface Sci., 101, 107, 1984) the polymerization in inverse microemulsions of acrylamide, where the microemulsions are formulated with Aerosol-OT and toluene. Microlatexes are the product of this polymerization; these latexes have nominal diameters of 400 A. Durand et al. (Ger. Offen. 3520507 A1) disclose the preparation of latexes of poly (meth)acrylamide and other acrylic components in water-in-hydrocarbon microemulsions. Candau et al. (U.S. Pat. No. 4,521,317) disclose a process for making latexes by polymerizing water-in-oil microemulsions. Turner et al. (U.S. Pat. No. 4,521,580) disclose a microemulsion process for producing acrylamide-alkyl-acrylamide copolymers. Chew and Gan disclose (J. Polym. Sci., Polym. Chem., 23, 2225, 1985) the polymerization of methylmethacrylate, acrylic acid, and sodium acylamidostearate in water-in-oil microemulsions. The kinetics of acrylamide polymerization in inverse microemulsions, and the effects of potassium persulfate and AIBN initiators are discussed by Candau et al. (J. Polym. Sci.: Polym. Chem., 23, 193, 1985).

Durand et al. disclose (Great Britain Pat. No. 2161492) the production of stable latexes by microemulsion polymerization of water-in-oil microemulsions of alkali metal carboxylates and nonionic surfactants with HLB numbers in the range of 8 to 11. Altunina et al. disclose (Soviet Union Pat. No. 1237673) the synthesis of polyacrylamides by microemulsion polymerization. Gratzel et al. disclose (Langmuir, 2, 292, 1986) the photoredox-initiation of microemulsion polymerization of styrene, divinylbenzene, acrylamide, methylmethacrylate, and acrolein microemulsions. Candau et al. disclose J. Colloid Interface Sci., 114, 398, 1986) the copolymerization of water-soluble monomers in nonionic bicontinuous microemulsions. DeFazio discloses (U.S. Pat. No. 4,656,222) the preparation of high molecular weight polyacrylates in inverse (water in hydrocarbon) microemulsions.

Durand et al. W.S. Pat. No. 4.681.912) disclose a new Process, for making inverse microlatexes of water-soluble copolymers and the use of such latexes in oil recovery. Holtzscherer et al. disclose (Colloid Polym. Sci., 265, 1067, 1987) the polymerization of acrylamide in water-in-oil (isoparaffinic oil and Isopar M) microemulsions stabilized by nonionic emulsifiers. Murtagh et al. (ACS Polym. Preprints, 28, 441, 1987) and more recently Perez-Luna et al. (Langmuir, 6, 1040, 1990) disclose the preparation of polystyrene latexes by microemulsion polymerization in three component microemulsions. Kuo et al. (Macromolecules, 20, 1216, 1987) disclose the photoinitiation of microemulsion polymerization in styrene microemulsions using dibenzyl ketone as initiator. Candau et al. disclose (Progr. Colloid Polymer Sci., 73, 33, 1987) the copolymerization of acrylamide and sodium acrylate in non-ionic microemulsions. Giannetti and Vista disclose (European Pat. Application 250767 A1) a process for polymerizing fluorinated monomers in aqueous dispersions containing a perfluoropolyether microemulsion to obtain enhanced polymerization rates and uniformity of conversion. Ricoh assignors (Japanese Pat. NO. 63068602) disclose the production of ultrafine latex-particles by polymerization in water-in-oil microemulsions of water-soluble monomers. Kitahara and Konno (German Offen. No. 3534528 and U.S. Pat. No. 4,749,506) disclose microgel dispersions of magnetic particles and titania particles created by precipitation in water-in-oil microemulsions. Haque and Qutubuddin disclose (J. Polm. Sci.: Part C: Polym. Letters, 26, 429, 1988) the preparation of porous solids using microemulsion polymerization.

Glover and Graiver (U.S. Pat. No. 4,824,890) disclose a method of producing elastomeric films of silicones using curable microemulsions. Beckman et al. (WO Pat. No. 8904844, U.S. Pat. No. 4,933,404) disclose polymerization of monomers in microemulsions of supercritical polar fluids. Candau has comprehensively reviewed (Polymerization in Inverse Microemulsions, In *Comprehensive Polymer Science. The Synthesis, Characterkation, Reactions and Applications of Polymers*, Vol. 4, Chain Polymerization II, Eastmond, Ledwith, Russo, and Sigwalt, Editors, Pergamon, 1989, pp. 225-229) microemulsion polymerization in inverse (water-in-oil) microemulsions. The kinetics of acrylamide photopolymerization in Aerosol-OT inverse microemulsions and the effects of solution components on the termination mechanism in acrylamide microemulsion polymeric-acceleration have been disclosed by Carver et al. (J. Polym. Sc.: Part A: Polym. Chem., 27, 2161, 1989; 27, 2179, 1989). Vinson (Thesis, University of Minnesota, 1990) and Vinson et al. (J. Colloid Interface Sci., 142, 74, 1991) disclose the preparation of ultrafine polystyrene latexes by microemulsion polymerization. Puig et al. (J. Colloid Interface Sci., 137, 308, 1990) disclose the microemulsion copolymerization of styrene and acrylic acid in a dodecyltrimethylammonium bromide stabilized microemulsion. Perez-Luna et al. (Langmuir, 6, 1040, 1990) disclose the microemulsion polymerization of styrene in a three-component microemulsion stabilized with dodecyl-rimethylammonium bromide.

Latex Formation. Nanosized polymer particles prepared by emulsion or microemulsion polymerizations are also called "latexes". Latexes are used in coatings as binders to provide rapid film formation and to give better penetration into porous substrates, and because they result in films with improved optical and mechanical properties. However, traditional microemulsion polymerizations do not generally yield one-to-one structural copies of the prepolymerization amphiphile aggregates. The typical latexes obtained in microemulsion polymerization are 30-80 nm in diameter and are similar to what can be obtained by emulsion polymerization.

Polymerizations in o/w microemulsions stabilized with non-polymerizable surfactant. A variety of polymer latexes with sizes in the range 20-80 nm have been produced in o/w microemulsions. Microemulsions used in early studies normally contained four or more components, including a non-polymerizable surfactant, and a cosurfactant such as a short chain alcohol [J. O, Stoffer, T. Bone, *J. Dispersion Sci. Technol.*, 1979, 1, 37; J. O. Stoffer, T. Bone, *J. Polym. Sci., Polym. Chem. Ed.*, 1980, 18, 2641; S. S. Atik, J. K. Thomas, *J. Am. Chem. Soc.*, 1981, 103, 3543; S. S. Atik, J. K. Thomas, *J. Am. Chem. Soc.*, 1982, 104, 5868; S. Atik, J. K. Thomas, *J. Am. Chem. Soc.*, 1983, 105, 4515; P.-L. Kuo, N. J. Turro, C.-M. Tseng, M. S. El-Aasser, J. W. Vanderhoff, *Macromolecules*, 1987, 20, 1216]. However, these short chain alcohols often lead to chain transfer reactions during polymerization [J. E. Puig, V. H. Perez-Luna, M. Perez-Gonzalez, E. R. Macias, B. E. Rodriguez, E. W. Kaler, *Colloid Polym. Sci.*, 1993, 271, 114]. As reported by Thomas et al. [M. R. Ferrick, J. Murtagh, J. K. Thomas, *Macromolecules*, 1989, 22, 1515], polymerization of styrene in a ternary microemulsion stabilized by cetyltrimethylammonium bromide (CTAB) produced polystyrene particles with diameters of 5.4-27 nm. The resulting particle size decreased with increasing initiator concentration. This result initiated a number of studies with various ternary o/w microemulsions stabilized by cationic or anionic surfactants without cosurfactants. Besides styrene [V. H. Perez-Luna, J. E. Puig, V. M. Castano, B. E. Rodriguez, A. K. Murthy and E. W. Kaler, *Langmuir*, 1990, 6, 1040], monomers such as methylmethacrylate (MMA) [C. Larpent, R. F. Tados, *Colloid Polym. Sci.*, 1991, 269, 1171; L. M. Gan, C. H. Chew, S. C. Ng and S. E. Loh, *Langmuir*, 1993, 9, 2799], butylacrylate [I. Capek, P. Potisk, *Eur. Polym. J.*, 1995, 31, 1269; b) I. Capek, J. P. Fouassier, *Eur. Polym. J.*, 1997, 33, 173] and alkyl acrylates [I. Capek, V. Juranicova, *J. Polym. Sci. Polym. Chem.*, 1996, 34, 575] have been successfully polymerized in ternary o/w microemulsions with particle sizes ranging from 20 to 60 nm in diameter. However, these microemulsion systems usually required a high concentration of surfactant (7-15 wt %) to solubilize a relatively low amount of monomer (<10 wt %). A major drawback of these polymerizations is that the presence of higher amounts of surfactant makes the workup very tedious when trying to separate the surfactant from the latex product.

Antonietti [M. Antonietti, W. Bremser, C. Muschenbom, B. Rosenauer, B. Schupp, M. Schmidt, *Macromolecules*, 1991, 24, 6636] and Wu [C. Wu, *Macromolecules*, 1994, 27, 298] incorporated high concentrations of initiator and crosslinker in styrene microemulsion polymerizations. A linear dependence of particle radius on volume fraction of the dispersed phase was demonstrated for CTAB stabilized cross-linked polystyrene microemulsions. The cross-linking network in these microemulsions decreases monomer transport and yields small latex particles. The smallest latexes produced had a diameter of ~10 nm.

More recently, Steytler et al. reported a successful synthesis of polystyrene particles in oil-in-water microemulsions stabilized by a cationic surfactant, dodecyltrimethylammonium bromide (DTAB) [D. C. Steytler, A. Gurgel, R. Ohly, M. Jung, R. K. Heenan, *Langmuir*, 2004, 20, 3509]. The polymerization was photoinitiated at 25° C. by the oil-soluble 2,2'-dimethoxy-2-phenyl acetophenone (DMPA), and was completed in one hour. The polystyrene particles produced almost had the same size as the parent microemulsion (radius=2-3 nm). Reaction speed is the main factor contributing to this result. The high concentration of initiator DMPA (6% w/v to styrene) and highly efficient dissociation of the initiator DMPA by UV are important contributors to the retention of the droplet diameter of the parent microemulsions. These factors combine to yield a high polymerization rate relative to the interparticle monomer diffusion (exchange) rate. This approach may be of more general use where retention of structure is sought in conventional microemulsion polymerization.

Nanoporous and microporous materials synthesized from microemulsions of aqueous phases and polymerizable monomers are known. The preparation of nanostructured polymeric materials in microemulsions has been a particularly active research area. One of the important contributions in this field was provided by Cheung et al. [W. R. Palani Raj, M. Sasthav, H. M. Cheung, *Langmuir*, 1991, 7, 2586; W. R. Palani Raj, M. Sasthav, H. M. Cheung, *Langmuir*, 1992, 8, 1931; M. Sasthav, W. R. Palani Raj, H. M. Cheung, *J. Colloid Interf. Sci.*, 1992, 152, 376; W. R. Palani Raj, M. Sasthav, H. M. Cheung, *J. Appl. Polym. Sci.*, 1993, 47, 499; W. R. Palani Raj, M. Sasthav, H. M. Cheung, *Polymer*, 1995, 36, 2637; V. Challa, K. Kuta, S. Lopina, H. M. Cheung, E. von Meerwall, *Langmuir* 2003, 19, 4154]. These authors found a correlation between morphologies of synthesized materials and the nature of parent microemulsions. Polymerization in a w/o microemulsion usually yielded a closed cell porous polymeric solid, while in a bicontinuous microemulsion produced an interconnected porous (open-cell) structure with water channels through the polymeric material.

Polymerizations in bicontinuous microemulsions utilizing non-reactive surfactants. Cussler et al. prepared microporous copolymers containing PMMA by the copolymerization of organic monomers in bicontinuous microemulsions stabilized by didodecyldimethylammonium bromide [J. H. Burban, M. He, E. L. Cussler, *AIChE J.*, 1995, 41, 1165]. The polymerization retained certain length scales preserved in the microemulsion structure and the microporous materials exhibited surface areas as high as 70 $m^2/g$. Although the microstructures of the materials were destroyed by the extraction and disappeared on drying, these results indicate that the microemulsion structures can be retained to a certain extent after the polymerization. However, bicontinuous microemulsions stabilized by non-polymerizable surfactants are usually unstable and very often exhibit visible microphase separation during the polymerization.

Polymerization in bicontinuous microemulsions utilizing reactive surfactants. Polymerization in bicontinuous microemulsions stabilized by polymerizable surfactants has been extensively studied by Gan et al. [L. M. Gan, T. H. Chieng, C. H. Chew and S. C. Ng, *Langmuir*, 1994, 10, 4022; T. H. Chieng, L. M. Gan, W. K. Teot, K. L. Pey, *Polymer*, 1995, 36, 1941; T. H. Chieng, L. M. Gan, C. H. Chew and S. C. Ng, *Polymer*, 1996, 37, 5917; L. M. Gan, T. D. Li, C. H. Chew, *Langmuir*, 1995, 11, 3316; L. M. Gan, T. D. Li, C. H. Chew, W. K. Teo, L. H. Gan, *Langmuir*, 1996, 12, 5863; T. D. Li, C. H. Chew, S. C. Ng, L. M. Gan, W. K. Teo, J. Y. Gu, G. Y. Zhang, *J. Macromol. Sci., Pure Appl. Chem.*, 1995, A32, 969; L. M. Gan, T. H. Chieng, C. H. Chew, S. C. Ng, K. L. Pey, *Langmuir*, 1996, 12, 319; L. M. Gan, T. D. Li, C. H. Chew, C. H. Quek, L. H. Gan, *Langmuir*, 1998, 14, 6068; L. M. Gan, P. Y. Chow, C. H. Chew, C. L. Ong, J. Wang, G. Xu, *Langmuir*, 1999, 15, 3202; P. Y. Chow, L. M. Gan, *Adv. Polym. Sci.*, 2005, 175, 257] Polymerizable surfactants such as sodium SEAAU, AUTMAB, and AUDMAA have been used to prepare bicontinuous microemulsions for polymerizations. Ethyleneglycol dimethacrylate (EGDMA) was added as cross-linker to all of these bicontinuous microemulsions to enhance the mechanical strength of the polymers. Most of the resulting polymerizations produced open cell nanoporous polymeric materials. The width of the polymerized bicontinuous nanostructures can be controlled between 2-150 nm by simply adjusting the concentrations of water, polymerizable surfactant, and electrolyte in precursor bicontinuous microemulsions.

Polymerizable macromonomer surfactants have also been used to form bicontinuous microemulsions. For example, polymerization of acrylonitrile in a bicontinuous microemulsion containing acrylonitrile, 4-vinylbenzenesulfonic acid lithium salt, ethylene glycol dimethacrylate, water, and a polymerizable nonionic surfactant, ω-ethoxy poly(ethyleneoxy)$_{40}$ undecyl-α-methacrylate ($C_1$-PEO-$C_{11}$-MA-40), proceeded very rapidly, and gel formation usually occurred within 20 minutes [W. Xu, K.-S. Siow, Z. Gao, S.-Y. Lee, P.-Y. Chow and L.-M. Gan, *Langmuir*, 1999, 15, 4812]. After ethanol extraction, the transparent polymer solids exhibited open-cell porous microstructures. These pores might be derived from the interconnected water-filled voids generated from coalescence of growing particles during polymerization. The water in the membrane could be freely exchanged with organic solvents or electrolyte solutions in these microporous membranes. The membranes can also be filled with electrolyte solutions to form polymeric composite electrolytes. Such composite electrolytes may be used in many electrochemical devices.

Liu et al. produced nanoporous polymer membranes from the copolymerization of acrylonitrile with the polymerizable surfactant $C_1$-PEO-$C_{11}$-MA-40 in both w/o and bicontinuous microemulsions [J. Liu, W. K. Teo, C. H. Chew, L. M. Gan, *J. Appl. Polym. Sci.*, 2000, 77, 2785]. Besides surfactants and acrylonitrile monomers, microemulsions containing water and the cross-linker EGDMA were initiated by ammonium persulfate and polymerized at 30° C. After the polymerization, microemulsion samples were cast onto glass plates and formed translucent membranes. The resulting membranes were extracted with water to produce the pores. Membranes polymerized from bicontinuous microemulsion showed larger (1.1-2.4 nm) and open-cell pores. In contrast, much smaller (0.38-0.62 nm) and closed-cell pores were obtained from w/o microemulsion polymerization. These porous membranes may be used in nanofiltration.

More recently, Gan et al. synthesized pH-sensitive gels in bicontinuous microemulsions [G. R. Deen, L. H. Gan and Y. Y. Gan, *Polymer*, 2004, 45, 5483]. A polymerizable piperazine cationic surfactant, N,N'-dimethyl-N-acryloyloxyundecyl piperazinium bromide was used to stabilize a bicontinuous microemulsions containing MMA/hydroxyethylmethacrylate (HEMA), acrylonitrile and initiator AIBN. Copolymerization of MMA/HEMA did not show any micropores, while those obtained using acrylonitrile revealed the existence of open-cell type micropores and also of the bicontinuous nature of the system. The width of the bicontinuous structure (micropores) of polyacrylonitrile was found to be about 33 nm in the dry state, with long and winding channels of random distribution. The swelling of the gels was found to be highly sensitive to pH.

Capturing nanoscopic length scales in microemulsion polymerization. In conclusion, several empirical principles for capturing nanoscopic structures by polymerization in microemulsions can be derived from the foregoing studies: 1) provide sufficient degrees of freedom so that surfactants can polymerize without significantly disrupting interfacial packing; 2) incorporate a reactive chemical component (monomer, salt ion) as part of surfactant headgroup or incorporate a reactive groups in the surfactant tail; 3) increase the lifetime of the interfacial surfactant assembly relative to the reaction half-life (increase polymerization reaction rate) [F. Yan and J. Texter, *Soft Matter,* 2006, 2, 109-118].

Catalyst Supports

Mehnert et al., in U.S. Pat. No. 6,673,737, disclose a novel supported ionic liquid moiety which may further comprise immobilized ionic fluids and catalytic material is described. A method for making the composition is also described.

Advanced Composite Materials

There is no teaching that shows the stabilization of microemulsions by ionic liquid-surfactant. There is no teaching that shows the stabilization of microemulsions by reactive ionic liquid-surfactant. There is no teaching of a porous material comprising a copolymer of a Class II fluid and reactive ionic liquid surfactant and Class I fluid. There is no teaching of a method for synthesizing a porous material comprising the steps of: preparing a reactive ionic liquid surfactant stabilized microemulsion of Class I fluids and Class II fluids, and polymerizing the microemulsion to form a porous solvogel material. There is no teaching of a method for synthesizing a porous material comprising the steps of: preparing a reactive ionic liquid surfactant stabilized microemulsion, polymerizing the microemulsion to form a solvogel material, and treating the solvogel with a pore-forming condensation component by ion-exchange or by solvent shifting.

SUMMARY

The present invention provides a microemulsion of on or more immiscible Class I fluids and one or more Class II fluids stabilized by reactive ionic liquid surfactant wherein the ionic liquid surfactant has a melting point less than 80° C. The invention also provides a composite material comprising a copolymer of ethylenically reactive species, wherein one of the species is a reactive ionic liquid surfactant having a melting point less than 80° C., and wherein the material also comprises non-reactive Class I fluid. The invention further provides a method for synthesizing a composite material comprising preparing a microemulsion of immiscible Class I fluid and Class II fluid stabilized by reactive ionic liquid surfactant wherein the ionic liquid surfactant has a melting point less than 80° C., and polymerizing the microemulsion to form a composite material.

The composite materials of the present invention that result in latex suspensions provide latex particles of very small size that are extremely stable with respect to salt. This superior stability is obtained by formulating their constituent copolymers to be richly doped in ionic liquid surfactant components, and to therefore retain colloidal stability even when the added salt is quite high (of order 1 molar).

The composite materials of the present invention constitute a new class of hydrogels when heavily solvated with water and a new class of solvogels, when solvated with other solvents, such as water miscible solvents.

Composite materials of the present invention can be reversibly transformed between solvogels with only nanoporosity and extremely high resistance to convective flow, and nanoporous to microporous open cell materials that readily allow flow. These physical state extremes can be tuned by modifying the ionic liquid surfactant counter ion and/or by modifying the particular water-miscible solvent used. Filters derived from such composite materials, therefore, can be used to slow or speed flow, by functioning as a switchable filter material.

The copolymers and composite materials of the present invention, when comprising cationic reactive ionic liquid surfactants will likely exhibit antibacterial disinfecting properties, as cationic surfactants and oligomeric polymers of cationic groups are know to be effective as antimicrobial agents.

The composite materials of the present invention may be easily fashioned into open cell porous materials. Such materials can be very effective in water purification and water treatment applications. Moreover, since the materials can be intrinsically antimicrobial, new classes of filters lasting much longer than current filters can be designed and constructed from the composite materials of the present invention.

The porosity of the open cell composite materials of the present invention can be tuned by altering cross-linker density, reactive monomer selection, and the solvent and counter ions selected in formulating the microemulsion precursor solution and in formulating any post polymerization treatments. The resulting cross-linked copolymer membranes can be used for gas and liquid filtering.

The open cell composite materials of the present invention can be used as a catalyst support material. Furthermore, catalytic metals may be deposited or ion exchanged into the materials of the present invention. These metals may be chemically or thermally reduced so as to yield supported high-activity catalysts.

Because thermally initiated polymerization is pursued, the composite materials of the present invention may essentially be of any pore size and of any physical dimension that can be described as a suitable mold.

The porous composite materials with larger pores, tens of microns and larger, can be used as tissue scaffolds in tissue and organ regeneration. The porous composite materials can also be used to provide porous titania implant devices by well-established templating methods of the present invention.

The composite materials of the present invention are based upon copolymers derived from reactive ionic liquid surfactants, and therefore are inherently charged. These composite materials, therefore, will be inherently ignition and fire resistant. When certain inorganics are added to the composite materials of the present invention, such as $PF_6^-$ ions, these composite materials will become even more ignition resistant and combustion resistant. In addition, the copolymers of the present invention may be tailored to have extensive perfluorocarbon components, which adds to the combustion resistance of such composite materials.

When closed cell morphologies are obtained, the resulting composite materials can be used to fabricate useful thermally insulating materials.

When porous metal, metal oxide, or other inorganic phases are needed, of a given pore size range, and in a given overall dimension, the composite materials of the present invention far surpass the materials made by perfusing open cell pores in photonic crystals and random bead assemblies. The porous composites of the present invention may be made in any pore dimension by relatively low temperature thermally initiated polymerization. One only needs a suitably sealed mold and means to uniformly heat the body for 2-24 hours in order to obtain complete conversion in the chain radical polymerization processes of the present invention.

DETAILED DESCRIPTION

Microemulsion Compositions

Figure 1:
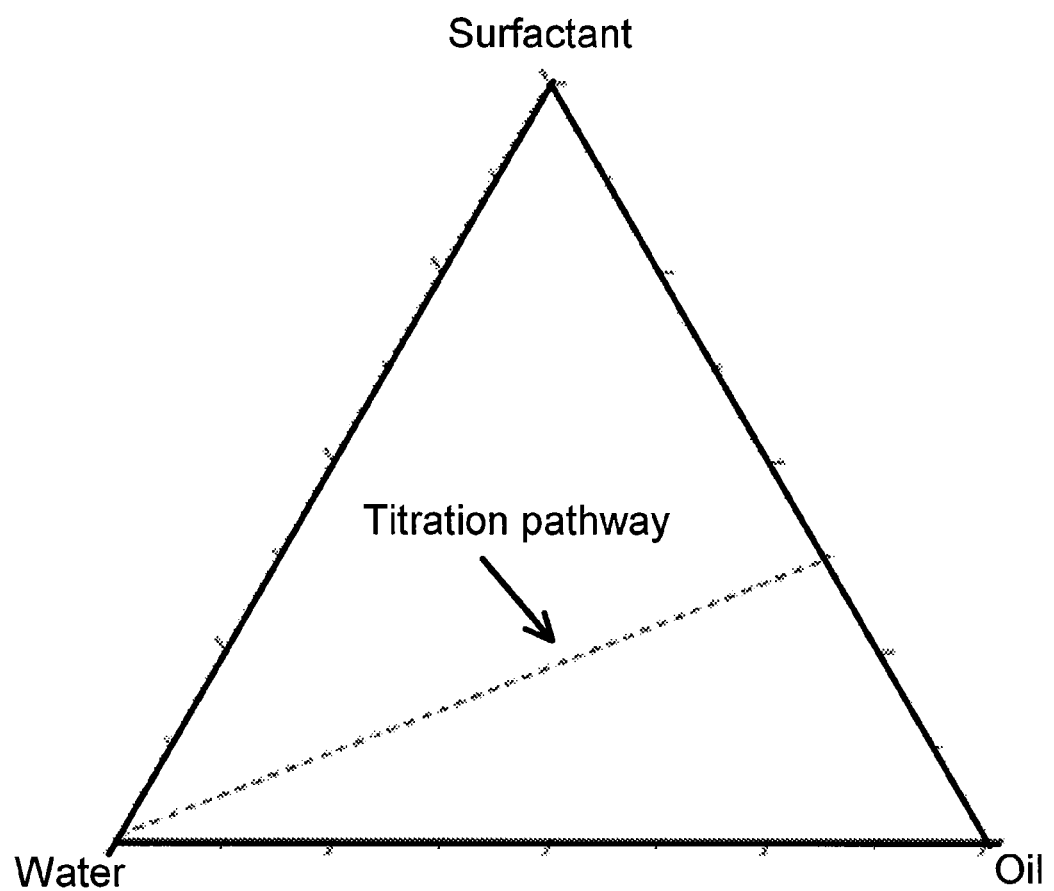
FIG. 1. Visual titration path along a composition segment having constant surfactant/oil ratio FIG. 2. Visual titration path along a composition segment having constant surfactant weight fraction FIG. 3. Partial ternary phase diagram of the a-Br/water/MMA system at 24° C. and 60° C. The domain areas to the left of the indicated partial boundaries are single phase microemulsion domains. Multiphase emulsion domains lie immediately to the right of the partial boundaries.

Typically three or more components are needed for the microemulsions of the present invention: two immiscible fluids (one of Class I and one of Class II) and a surfactant. A Class I fluid is typically a polar solvent such as water, propylene glycol, ethylene glycol, a low molecular weight alcohol, dimethyl acetamide (DMA), methyl acetamide, methyl formamide, dimethyl formamide (DMF), dimethyl sulfoxide (DMSO), or tetrahydrofuran (THF). Mixtures of such polar solvents may be used in the place of any single species. A Class II fluid is typically a reactive monomer selected from the broad class of chemical compounds that undergo radical chain polymerization under suitable conditions and generally known as vinyl compounds, acrylates, and methacrylates. Such reactive fluids may also be used in combination with suitably immiscible organic solvents such as hydrocarbon and aromatic solvents, particularly so as to enable the use of an otherwise solid but soluble reactive monomer. In addition to such typical hydrocarbon and aromatic solvents, near critical and super critical solvents of any type may be used as a component of Class II fluids, solvents or solvent mixtures. The surfactants of the present invention are derived from ionic liquids and are ionic liquids themselves.

Class I fluids. These fluids are solvents and solvent solutions. These fluids comprise primary components that include water and water-miscible polar solvents including methanol, ethanol, 1-propanol, isopropanol, 1-butanol, 2-butanol, t-butanol, formic acid, acetic acid, formamide, acetone, tetrahydrofuran, acetonitrile, dimethylformamide, methylformamide, dimethyl sulfoxide. These fluids also include solvents such as ethylene glycol, propylene glycol, and glycerol. Furthermore, these fluids include pyridine, furfuryl alcohol, benzyl alcohol, and tetrahydrofurfuryl alcohol.

These fluids also additionally may include secondary components that are reactive monomers that are soluble in water and water-miscible polar solvents having the general structure I,

$$CH_2\!=\!C(X)Y \qquad (I)$$

wherein X is H, halogen, or alkyl of 1 to 6 carbons and Y is acyl acid, ester, or amide.

In preferred embodiments of the present invention X is H or methyl so as to maximize solubility in water or water-miscible polar solvent. In preferred embodiments of the present invention Y is —CO$_2$H, —CO$_2$M, where M is alkali or other cation, —CO$_2$E, where E provides sufficient solubility in the respective primary component or components, —CONH$_2$, or —CONHZ, where Z provides sufficient solubility in the respective primary component or components. In the case the primary component is water or substantially water, preferred E and Z groups comprise methylene oxide oligomers, —(CH$_2$O)$_n$H, where n=1-20, ethylene oxide oligomers, —(CH$_2$CH$_2$O)$_n$H, where n=1-20, one or more hydroxyl groups, one or more amine groups, one or more ester groups, or one or more amide groups to insure sufficient solubility.

Preferred examples of secondary components of Class I fluids include sodium acrylate, sodium methacrylate, acrylamide, N-methylacrylamide, hydroxyethylacrylate, hydroxyethylmethacrylate, diethyleneoxidemethacrylate, triethyleneoxidemethacrylate, tetraethyleneoxidemethacrylate, pentaethylenoxidemethacrylate, diethyleneoxideacrylate, triethyleneoxideacrylate, tetraethyleneoxideacrylate, pentaethylenoxideacrylate. Particularly suitable examples of such primary components are reactive monomers including, but are not necessarily limited to, suitable solubilized styrenics, including sodium sulfonated syrene, acrylates, and methacrylates substituted with highly polar groups, unsaturated carbon and heteroatom acids such as acrylic acid, methacrylic acid, fumaric acid, maleic acid, itaconic acid, vinylsulfonic acid, vinylphosphonic acid, and their salts, vinylcarbazole, vinylimidazole, vinylpyrrolidone, and vinylpyridines.

Class II fluids. These fluids are liquid monomers and liquid monomer solutions. These fluids comprise primary components that include reactive monomers having structure II, $$CH_2=C(X)Y-Z \quad (II)$$

wherein X is H, halogen, or alkyl of 1 to 6 carbons and Y—Z is acyl acid, ester, or amide or Y is a bond or linking group connected to a useful moiety that may include any alkyl or aryl molecule having suitable liquidity or solubility.

In preferred embodiments of the present invention X is H or methyl so as to maximize reactivity in the chain transfer radical polymerization. In preferred embodiments of the present invention Y is a single bond, —O—, —CO—, —CO$_2$—, —SO$_2$—, —CON(R)—, —SO$_2$N(R), —N(R)CON(R), —N(R)CO$_2$—, —COCH$_2$CH$_2$—, —OCOCH$_2$CH$_2$—, —N(R)COCH$_2$CH$_2$—, —OSO$_2$CH$_2$CH$_2$—, —SO$_2$CH$_2$CH$_2$—, wherein R is H or alkyl of 1 to 6 carbons, and Z is H, linear or branched alkyl or 1 to 10 carbon atoms, or aryl of 1 to 10 carbon atoms.

Particularly suitable examples of such primary components are reactive monomers containing α-, β-ethylenic unsaturation. These include, but are not necessarily limited to, methacrylic acid esters, such as methyl methacrylate, ethyl methacrylate, isobutyl methacrylate, 2-ethylhexyl methacrylate, benzyl methacrylate, phenoxyethyl methacrylate, cyclohexyl methacrylate and glycidyl methacrylate, acrylate esters such as methyl acrylate, ethyl acrylate, isobutyl acrylate, 2-ethylhexyl acrylate, benzyl methacrylate, phenoxyethyl acrylate, cyclohexyl acrylate, and glycidyl acrylate, styrenics such as styrene, .alpha.-methylstyrene, 3- and 4-chloromethylstyrene, halogen-substituted styrenes, and alkyl-substituted styrenes, vinyl halides and vinylidene halides, N-alkylated acrylamides and methacrylamides, vinyl esters such as vinyl acetate and vinyl benzoate, vinyl ether, allyl alcohol and its ethers and esters, and unsaturated ketones and aldehydes such as acrolein and methyl vinyl ketone, isoprene, butadiene and acrylonitrile. Preferably, the monomers will be styrenics or acrylic esters or methacrylic esters. These monomers preferably have low solubility in water or other primary components of Class I fluids, since Class I fluids and Class II fluids are substantially immiscible.

Suitable secondary components of these Class II fluids are water-immiscible organic solvents. Such solvents include hexanes, heptanes, octanes, nonanes, decanes, undencanes, and dodecanes; they may be linear, branched, or cyclic. Such solvents also include toluene, xylene, and anisole.

Ionic liquid surfactants. The ionic liquid surfactants (ILS) of the present invention typically have melting points close to room temperature, with mp<80° C., more preferably with mp<50° C. and, most preferably with mp<30° C. It is preferable that the melting points for ILS be less than 80° C. so that there is minimal volatilization of the primary immiscible fluids of the microemulsion during dissolution and mixing, and further so that minimal heating is required to effect dissolution, so that any thermally sensitive components will not be significantly activated towards degradation. It is more preferred that the ILS melting points of the present invention be below 50° C., so that less thermally damaging activation may be applied in the preparation of the microemulsions of the present invention. It is most preferred that the ILS melting points of the present invention be below 30° C. so that reactive mixtures may be made at room temperature without significantly activating any thermal initiators that might be usefully included in the microemulsion formulations.

The ionic liquid surfactants (ILS) of the present invention have at least one reactively accessible double bond and are capable of polymerizing with themselves and with various ethylenically unsaturated compounds. The reactive ILS of the present invention are preferably capable of polymerizing with the ethylenically unsaturated components of the Class I fluids of the present invention. The reactive ILS of the present invention are preferably capable of polymerizing with the ethylenically unsaturated components of the Class II fluids of the present invention. Further, the reactive ILS of the present invention is a compound which is classified as a reactive surfactant.

The ionic liquid surfactants (ILS) of the present invention are described by the structure III $$(C^{+n})_m(A^{-m})_n \quad (III)$$

wherein $C^{+n}$ is an inorganic or organic cation and $A^{-m}$ is an inorganic or organic anion. Typically n=m=1. It is preferred that n<5 and that m<5 so that melting points are in the preferred range. At least one of $C^{+n}$ and $A^{-m}$ contains at least one reactively accessible double bond and where this double bond is capable of polymerizing with the ethylenically unsaturated compounds of the Class I fluids and of the Class II fluids articulated earlier. In every embodiment of the present invention, at least one of $C^{+n}$ and $A^{-m}$ contains at least one functional group rendering the $(C^{+n})_m(A^{-m})_n$ species amphiphilic with respect to the Class I fluid and Class II fluid utilized in the embodiment. The particular nature of such functional groups S depends on the nature of the Class I fluid and Class II fluid used in a particular embodiment. In every embodiment of the present invention, at least one of $C^{+n}$ and $A^{-m}$ contains at least one reactive group $CH_2=C(X)Y$— as defined in structures I and II above. In certain embodiments wherein the reactive ionic liquid surfactant according to structure III is already a reactive polyelectrolyte, n and m may be in the range of 10-300.

In every embodiment of the present invention the cationic and an ionic species, $C^{+n}$ and $A^{-m}$, respectively, are chosen or matched with one another so as to provide a melting point less than 80° C. These cationic and anionic species are also matched so as to obtain properties suitable to the material or composite being designed. For example, if a very high charge density is desired in the resulting polymeric material, both the cationic and anionic groups are selected to be polymerizable. For example, if it is desired that the resulting material be able to imbibe a large amount of water-immiscible solvent, one of $C^{+n}$ or $A^{-m}$ is selected to have hydrocarbon or perfluorocarbon chains miscible with the solvents to be imbibed.

When $C^{+n}$ is organic, it preferably comprises a quaternary nitrogen, phosphonium, or sulfonium group. Suitable quaternary nitrogen groups include ammonium, pyridinium, pyridazinium, pyrimidinium, pyrazinium, imidazolium, pyrazolium, thiazolium, oxazolium and triazolium groups.

The ammonium cation has the structure IV

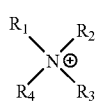

(IV)

wherein $R_1$, $R_2$, $R_3$, and $R_4$ each independently may be H, linear or branched alkyl of 1 to 20 carbon atoms, or aryl of 6 to 20 carbon atoms. When the ammonium group is amphiphilic, at least one of $R_1$, $R_2$, $R_3$, and $R_4$ has 6-20 carbon atoms if the Class II fluid is hydrocarbon-based, and in certain embodiments of the present invention, at least one of $R_1$, $R_2$, $R_3$, and $R_4$ comprises a reactive group $CH_2=C(X)Y—$ as defined in structures I or II above. If the Class II fluid is perfluorocarbon-based, at least on of $R_1$, $R_2$, $R_3$, and $R_4$ linear or branched alkyl of 1 to 20 carbon atoms, or aryl of 6 to 20 carbon atoms is partly to fully perfluoronated.

Useful examples of ammonium cations include the following:

$^+N(CH_3)_4$ (IV-1)

$^+N(CH_2CH_2CH_2CH_3)_4$ (IV-2)

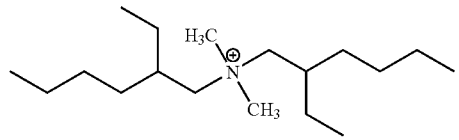
(IV-3)

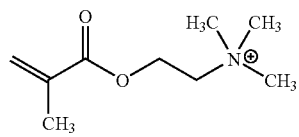
(IV-4)

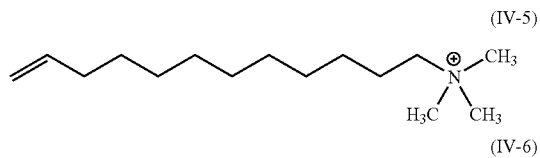
(IV-5)

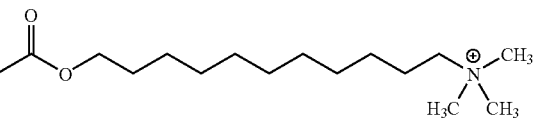
(IV-6)

The pyridinium group has the structure V

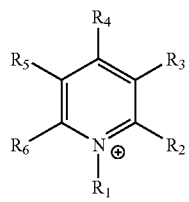
(V)

wherein $R_1$, $R_2$, $R_3$, $R_4$, $R_5$, and $R_6$ each independently may be H, linear or branched alkyl of 1 to 20 carbon atoms, or aryl of 6 to 20 carbon atoms. When the pyridinium group is amphiphilic, at least one of $R_1$, $R_2$, $R_3$, $R_4$, $R_5$, and $R_6$ has 6-20 carbon atoms if the Class II fluid is hydrocarbon-based, and in certain embodiments of the present invention, at least one of $R_1$, $R_2$, $R_3$, $R_4$, $R_5$, and $R_6$ comprises a reactive group $CH_2=C(X)Y—$ as defined in structures I or II above. If the Class II fluid is perfluorocarbon-based, at least on of $R_1$, $R_2$, $R_3$, $R_4$, $R_5$, and $R_6$ linear or branched alkyl of 1 to 20 carbon atoms, or aryl of 6 to 20 carbon atoms is partly to fully perfluoronated.

The pyrimidinium group has the structure VI

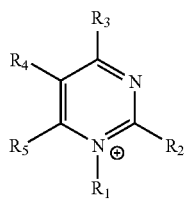
(VI)

wherein $R_1$, $R_2$, $R_3$, $R_4$, and $R_5$ each independently may be H, linear or branched alkyl of 1 to 20 carbon atoms, or aryl of 6 to 20 carbon atoms. When the pyrimidinium group is amphiphilic, at least one of $R_1$, $R_2$, $R_3$, $R_4$, and $R_5$ has 6-20 carbon atoms if the Class II fluid is hydrocarbon-based, and in certain embodiments of the present invention, at least one of $R_1$, $R_2$, $R_3$, $R_4$, and $R_5$ comprises a reactive group $CH_2=C(X)Y—$ as defined in structures I or II above. If the Class II fluid is perfluorocarbon-based, at least on of $R_1$, $R_2$, $R_3$, $R_4$, and $R_5$ linear or branched alkyl of 1 to 20 carbon atoms, or aryl of 6 to 20 carbon atoms is partly to fully perfluoronated.

The pyrazinium group has the structure VII

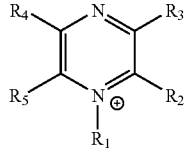
(VII)

wherein $R_1$, $R_2$, $R_3$, $R_4$, and $R_5$ each independently may be H, linear or branched alkyl of 1 to 20 carbon atoms, or aryl of 6 to 20 carbon atoms. When the pyrazinium group is amphiphilic, at least one of $R_1$, $R_2$, $R_3$, $R_4$, and $R_5$ has 6-20 carbon atoms if the Class II fluid is hydrocarbon-based, and in certain embodiments of the present invention, at least one of $R_1$, $R_2$, $R_3$, $R_4$, and $R_5$ comprises a reactive group $CH_2=C(X)Y—$ as defined in structures I or II above. If the Class II fluid is perfluorocarbon-based, at least on of $R_1$, $R_2$, $R_3$, $R_4$, and $R_5$ linear or branched alkyl of 1 to 20 carbon atoms, or aryl of 6 to 20 carbon atoms is partly to fully perfluoronated.

The imidazolium group has the structure VIII

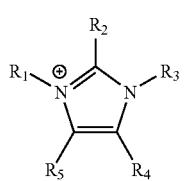
(VIII)

wherein $R_1$, $R_2$, $R_3$, $R_4$, and $R_5$ each independently may be H, linear or branched alkyl of 1 to 20 carbon atoms, or aryl of 6 to 20 carbon atoms. When the imidazolium group is amphiphilic, at least one of $R_1$, $R_2$, $R_3$, $R_4$, and $R_5$ has 6-20 carbon atoms if the Class II fluid is hydrocarbon-based, and in certain embodiments of the present invention, at least one of $R_1$, $R_2$, $R_3$, $R_4$, and $R_5$ comprises a reactive group $CH_2=C(X)Y—$ as defined in structures I or II above. If the Class II fluid is perfluorocarbon-based, at least on of $R_1$, $R_2$, $R_3$, $R_4$, and $R_5$ linear or branched alkyl of 1 to 20 carbon atoms, or aryl of 6 to 20 carbon atoms is partly to fully perfluoronated.

Useful examples of imidazolium cations include the following:

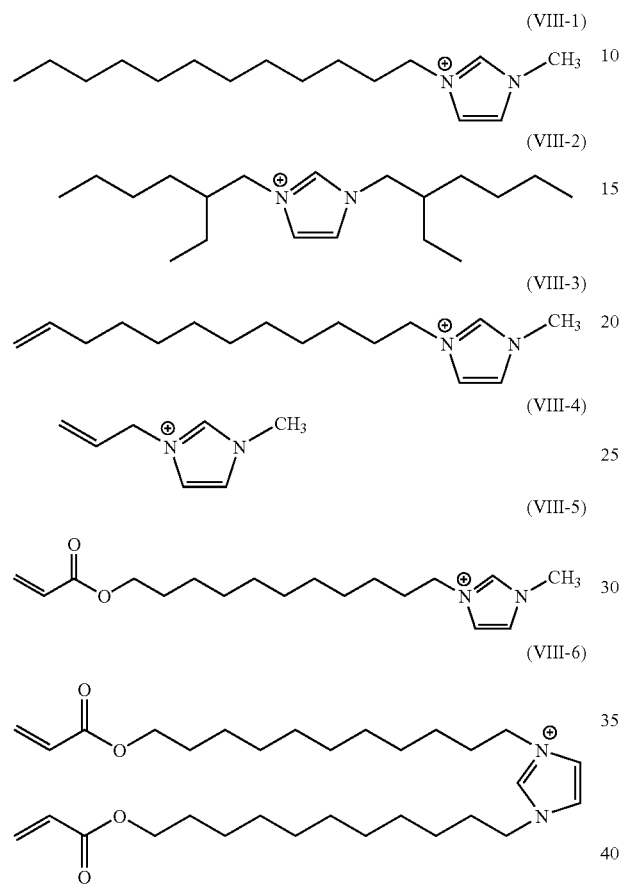

The pyrazolium group has the structure IX

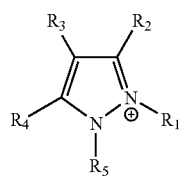

wherein $R_1$, $R_2$, $R_3$, $R_4$, and $R_5$ each independently may be H, linear or branched alkyl of 1 to 20 carbon atoms, or aryl of 6 to 20 carbon atoms. When the pyrazolium group is amphiphilic, at least one of $R_1$, $R_2$, $R_3$, $R_4$, and $R_5$ has 6-20 carbon atoms if the Class II fluid is hydrocarbon-based, and in certain embodiments of the present invention, at least one of $R_1$, $R_2$, $R_3$, $R_4$, and $R_5$ comprises a reactive group $CH_2=C(X)Y-$ as defined in structures I or II above. If the Class II fluid is perfluorocarbon-based, at least on of $R_1$, $R_2$, $R_3$, $R_4$, and $R_5$ linear or branched alkyl of 1 to 20 carbon atoms, or aryl of 6 to 20 carbon atoms is partly to fully perfluoronated.

The thiazolium group has the structure X

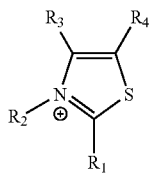

wherein $R_1$, $R_2$, $R_3$, and $R_4$ each independently may be H, linear or branched alkyl of 1 to carbon atoms, or aryl of 6 to 20 carbon atoms. When the thiazolium group is amphiphilic, at least one of $R_1$, $R_2$, $R_3$, and $R_4$ has 6-20 carbon atoms if the Class II fluid is hydrocarbon-based, and in certain embodiments of the present invention, at least one of $R_1$, $R_2$, $R_3$, and $R_4$ comprises a reactive group $CH_2=C(X)Y-$ as defined in structures I or II above. If the Class II fluid is perfluorocarbon-based, at least on of $R_1$, $R_2$, $R_3$, and $R_4$ linear or branched alkyl of 1 to 20 carbon atoms, or aryl of 6 to 20 carbon atoms is partly to fully perfluoronated.

The oxazolium group has the structure XI

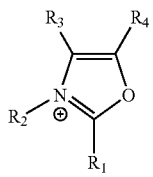

wherein $R_1$, $R_2$, $R_3$, and $R_4$ each independently may be H, linear or branched alkyl of 1 to 20 carbon atoms, or aryl of 6 to 20 carbon atoms. When the oxazolium group is amphiphilic, at least one of $R_1$, $R_2$, $R_3$, and $R_4$ has 6-20 carbon atoms if the Class II fluid is hydrocarbon-based, and in certain embodiments of the present invention, at least one of $R_1$, $R_2$, $R_3$, and $R_4$ comprises a reactive group $CH_2=C(X)Y-$ as defined in structures I or II above. If the Class II fluid is perfluorocarbon-based, at least on of $R_1$, $R_2$, $R_3$, and $R_4$ linear or branched alkyl of 1 to 20 carbon atoms, or aryl of 6 to 20 carbon atoms is partly to fully perfluoronated.

The triazolium group has the structure XII

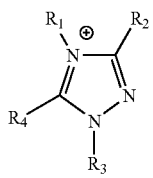

wherein $R_1$, $R_2$, $R_3$, and $R_4$ each independently may be H, linear or branched alkyl of 1 to 20 carbon atoms, or aryl of 6 to 20 carbon atoms. When the triazolium group is amphiphilic, at least one of $R_1$, $R_2$, $R_3$, and $R_4$ has 6-20 carbon atoms if the Class II fluid is hydrocarbon-based, and in certain embodiments of the present invention, at least one of $R_1$, $R_2$, $R_3$, and $R_4$ comprises a reactive group $CH_2=C(X)Y-$ as defined in structures I or II above. If the Class II fluid is perfluorocarbon-based, at least on of $R_1$, $R_2$, $R_3$, and $R_4$ linear or branched alkyl of 1 to 20 carbon atoms, or aryl of 6 to 20 carbon atoms is partly to fully perfluoronated.

The phosphonium group has the structure XIII

(XIII)

wherein $R_1$, $R_2$, $R_3$, and $R_4$ each independently may be H, linear or branched alkyl of 1 to carbon atoms, or aryl of 6 to 20 carbon atoms. When the phosphonium group is amphiphilic, at least one of $R_1$, $R_2$, $R_3$, and $R_4$ has 6-20 carbon atoms if the Class II fluid is hydrocarbon-based, and in certain embodiments of the present invention, at least one of $R_1$, $R_2$, $R_3$, and $R_4$ comprises a reactive group $CH_2\!=\!C(X)Y$— as defined in structures I or II above. If the Class II fluid is perfluorocarbon-based, at least on of $R_1$, $R_2$, $R_3$, and $R_4$ linear or branched alkyl of 1 to 20 carbon atoms, or aryl of 6 to 20 carbon atoms is partly to fully perfluoronated.

Useful examples of phosphonium cations include the following:

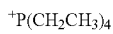
(XIII-1)

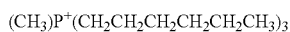
(XIII-2)

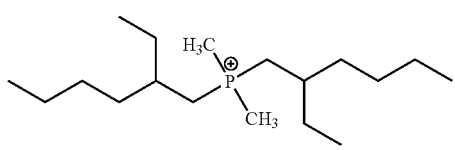
(XIII-3)

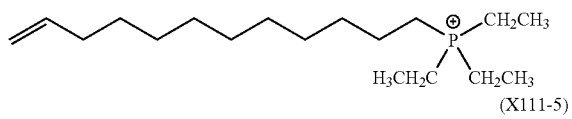
(XIII-4)

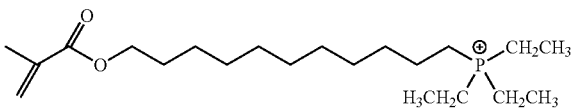
(XIII-5)

The sulfonium group has the structure XIV

(XIV)

wherein $R_1$, $R_2$, and $R_3$ each independently may be H, linear or branched alkyl of 1 to 20 carbon atoms, or aryl of 6 to 20 carbon atoms. When the sulfonium group is amphiphilic, at least one of $R_1$, $R_2$, and $R_3$ has 6-20 carbon atoms if the Class II fluid is hydrocarbon-based, and in certain embodiments of the present invention, at least one of $R_1$, $R_2$, and $R_3$ comprises a reactive group $CH_2\!=\!C(X)Y$— as defined in structures I or II above. If the Class II fluid is perfluorocarbon-based, at least on of $R_1$, $R_2$, and $R_3$ linear or branched alkyl of 1 to 20 carbon atoms, or aryl of 6 to 20 carbon atoms is partly to fully perfluoronated.

When $C^{+n}$ is inorganic it may be selected from the group consisting of alkali cations including $Li^+$, $Na^+$, $K^+$, $Cs^+$, and $Rb^+$ and further including $Cu^+$ and $Ag^+$.

When $A^{-m}$ is inorganic it may be selected from the group consisting of halides, including $F^-$, $Cl^-$, $Br^-$, and $I^-$, and pseudohalides including $CN^-$, $NCS^-$, $NCO^-$, $OCN^-$.

Methods for synthesizing ammonium salts suitable for providing cationics according to structure IV are well known in the art. K. Rasheed in an article on Industrial Synthesis of Surfactants in *Surfactants—A Practical Handbook* (K. R. Lange, Editor, Carl Hanser Verlag, Munich, 1999; pp. 113-116) reviews major pathways for the synthesis of a variety of tetraalkyl ammonium and dialkyl imidazolium surfactants. Behler et al. in a Chapter on Industrial Surfactant Synthesis (J. Texter, Editor, *Reactions and Synthesis in Surfactant Systems*, Marcel Dekker, New York, 2001; pp. 30-33) describe pathways for tetralkylammonium surfactant synthesis.

Microemulsions. Microemulsions of the present invention are formulated by simple and low-shear mixing of a fluid of Class I with a fluid of Class II followed by the addition of a suitable amount of ionic liquid surfactant. In general, the order of addition of these three components or pseudocomponents does not matter, although the predissolution of the ionic liquid surfactant in either the fluid of Class I or in the fluid of Class II will often result is slightly faster dissolution of all three components, yielding an optically clear (to the eye) solution (single phase microemulsion). The amount of each component to add together with each of the other components is determined by simple experimentation, as is well known in the art. A useful approach is to first determine all or part of the microemulsion phase boundary or boundaries in a three component or three pseudocomponent system, comprising ionic liquid surfactant, fluid of Class I, and fluid of Class II. We use the term "pseudocomponent" in referring to either a Class I or a Class II fluid that comprises two or more actual chemical components. For example, a Class I fluid comprising water and a polymerizable monomer such as acrylamide would be a pseudocomponent. A Class I fluid comprising water and n-propanol would be a pseudocomponent. A Class II fluid comprising methylmethacrylate and a cross-linker such as ethylene glycol dimethacrylate would be a pseudocomponent. In the event that two or more ionic liquid surfactants are used simultaneously, the ionic liquid surfactant would be a pseudocomponent. If a conventional (not an ionic liquid) surfactant is used together with an ionic liquid surfactant, the ionic liquid surfactant would be a pseudocomponent.

Since a ternary system of surfactant and two immiscible liquids typically comprise many different phases, including various types of liquid crystalline phases involving the surfactant, solution phase or phases (microemulsion phase or phases), as well as a variety of different multiphase domains wherein two or more phases are in coexistence, it is advantageous to experimentally determine partial or full microemulsion phase boundaries. The methods for doing so are straightforward and reasonably well known in the art. The following procedure illustrating microemulsion phase diagram mapping is taken from the MS Thesis, Synthesis of polymer/nanodroplet composites from reverse microemulsion polymerization, by Lehui Ge (Eastern Michigan University, Ypsilanti, Mich., 2004):

Phase Diagram Mapping

Ternary phase diagrams of water/surfactant/oil have been determined by visual titration of water with surfactant-in-oil solutions in sealed culture tubes or vials with PTFE coated rubber liners at room temperature (22±1° C.). Surfactant, oil, and water were mixed thoroughly either by hand shaking or by mixing with a wrist-action shaker or ultrasonicator. The transparency or turbidity of such systems after equilibrium indicates either a transparent microemulsion or reverse microemulsion (thermodynamically stable single-phase microemulsion solution) or if turbid a multi-phase composition, respectively.

To determine an $L_2$ microemulsion (reveres or water-in-oil microemulsion) domain boundary, measurements of how much water can be solubilized in a surfactant/oil solution are carried out. Water is added into a surfactant/oil solution by micropipette with detailed gravimetric recording of compositional changes, and then the mixture is shaken by hand or is sonicated when needed to see if a clear solution forms or if the mixture is turbid after equilibrating. If the mixture is transparent, the composition is one within the microemulsion domain. If the mixture remains turbid, the composition is one outside of the microemulsion domain. If the composition is transparent, more water is added to test again for transparency (within microemulsion domain) or turbidity (outside of microemulsion domain). If the composition is turbid, more surfactant/oil solution is added to move the composition part way back (typically about half-way back) along a compositional line connecting the water corner of the ternary phase diagram with the surfactant/oil composition on the surfactant/oil axis. These additions of water or surfactant/oil are continued until the distance between transparent and turbid compositions is smaller than the error one wishes to have in estimating a boundary point of the microemulsion domain. The boundary point is then determined by simply averaging the compositions of the closest transparent and turbid compositions tested. Titrations can be done at various concentration of surfactant in oil up to the solubility of surfactant in oil (FIG. 1). Sometimes, at high concentration, it takes a long time for surfactant to dissolve and the surfactant/oil solution may become too viscous. For example, it takes about one week to dissolve Aerosol-OT surfactant in methylmethacrylate (MMA) at 80 wt % surfactant, and the solution is highly viscous. In such cases, we may only map out the microemulsion domain up to a particular level of surfactant. $L_1$ (water-in-oil) microemulsion domains and irregular bicontinuous microemulsion domains, wherein the water and oil corners of the ternary phase diagram are simply connected, can be mapped out using similar methods.

Figure 2:
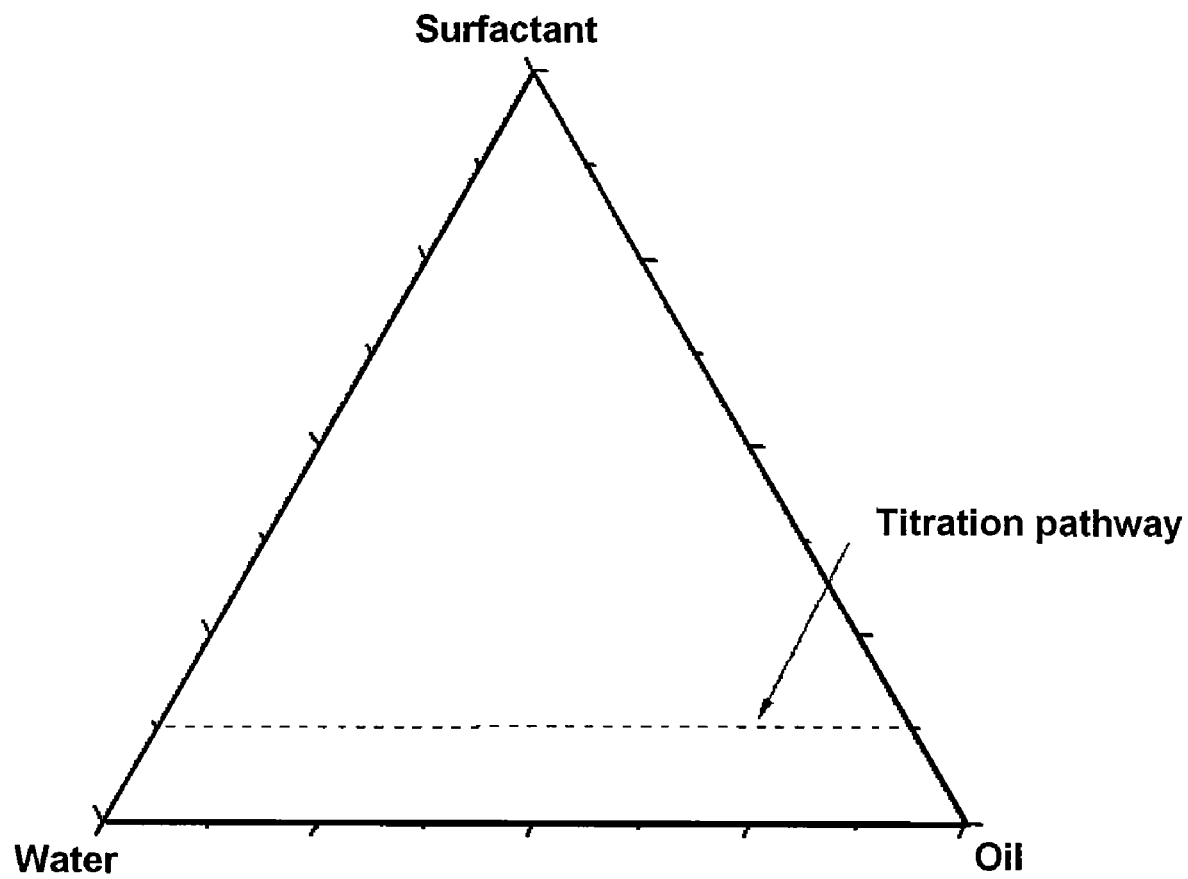

Alternate compositional pathways parallel to the water-oil axis, can be explored to find one or more boundary points of a microemulsion domain. FIG. 2 illustrates such a pathway, and it is most easily explored by preparing solutions of surfactant in water and surfactant in oil, corresponding to the compositions at either extreme of the pathway illustrated in FIG. 2. Compositions may be prepared by mixing various ratios of each of the end point surfactant/water and surfactant/oil solutions. Resulting transparency establishes a microemulsion domain composition and turbidity establishes a composition outside of the microemulsion domain. Compositions between these points are then prepared at a frequency sufficient to allow estimation of a boundary point to whatever accuracy is required.

Yet another approach to determining boundary points in regions where the previous approaches are not convenient, such as along a titration pathway perpendicular to the water-oil axis, requires preparing separate compositions along the pathway, without the use of two component solutions. For example, particular amounts of immiscible water and oil are weighed into a container, and then the requisite amount of surfactant is added. A series of compositions is prepared, and these compositions are subjected to gentle shaking overnight. Any that completely dissolve then establish interior microemulsion domain compositions, and the interval between such a point with a composition that did not completely enter into a solution (microemulsion) state is then explored with greater precision until a suitable boundary point is estimated.

Free radical microemulsion polymerization of useful vinyl monomers has been found to be a useful process for making the useful polymers, materials and latexes of the present invention. Such microemulsions are made by dissolving useful monomers and comonomers in an isotropic oil-in-water microemulsion comprising monomers or co monomers, surfactant, surfactants, and/or cosurfactants, water, and electrolytes, or alternatively in an isotropic water-in-oil microemulsion comprising monomers or comonomers, surfactant, surfactants, and-/or cosurfactants, water, and a fluid that is immiscible with water (e.g., ethylacetate, supercritical pentane). Such microemulsions are transparent or nearly transparent to the eye at 1% (w/w) or greater monomer, ultrafine in particle (droplet) size (typically in the range of 30 to 900 Å in diameter), and spontaneously form upon combing all the components with moderate stirring. Stirring is accomplished by any mechanical means commonly known in the art and appropriate for the volume of reactants. Such means include, but are not restricted to, magnetic stirring bars and impellers of any type and means for magnetically coupling them to a rotating drive, marine propellers of any type and size and means for rotating the propellers in the reactant solution or suspension, rotating disk, cylinder, and turbine stirrers of any type and means for mechanically rotating them, convective stirring achieved by circulating the reagent solution or suspension at any suitable volume flow rate and means for achieving the circulation which include pumping of any sort, convective stirring achieved by shaking or tumbling the reactor by any means, convective stirring achieved by passing the reaction solution or suspension through any mechanical milling device such as a colloid mill or homogenizer of any sort. Preferred means of stirring are those that expend minimal mechanical energy such as magnetic bar and impeller, marine propeller, and rotating disk and turbine stirrers.

Microemulsion Polymerization

Suitable microemulsions are formulated so as to make nanoparticles of the present invention by polymerizing compositions suitably close to the Class I fluid corner of the ternary phase diagram or suitably close to the Class II fluid corner, within a microemulsion domain. Alternatively, suitable microemulsions are formulated so as to make composite solids of the present invention by polymerizing compositions anywhere in the microemulsion domain wherein at least the continuous pseudophase contains a polymerizable monomer, such as encountered in microemulsion domains that have droplet disperse pseudophases, or as encountered in irregular bicontinuous microemulsions, one or both of the continuous pseudophases contain a polymerizable monomer. When there is substantially more Class I fluid than Class II fluid, the resulting polymerized solid will have the characteristic of a gel, particularly when the Class I fluid is an aqueous solution. When there is substantially more Class II fluid than Class I fluid, the resulting polymerized solid will be transparent to opaque depending on the degree of microphase separation, if any, during the polymerization process The microemulsion so formed is deaerated during and subsequent to the mixing of its components, prior to initiation, or in the case that the microemulsion is not deaerated, an excess of initiator is used to consume any dissolved oxygen present in the micro emulsion. Deaeration may be achieved by any of the methods commonly known in the art. A preferred method of deaeration comprises passing a stream of inert gas through the reaction mixture at a sufficient flow rate and for a sufficient time to expel a sufficient amount of dissolved oxygen from the reaction mixture, where nitrogen is a preferred inert gas. Other inert gases such as argon may be used with equal efficacy.

Cross-linking agents of any suitable type may be used, so long as their addition does not cause the microemulsion composition to separate into multiple phases from a single isotropic solution phase. Suitable cross-linking agents comprise monomers containing include vinyl groups, acrylates, methacrylates, vinyl ethers and vinyl esters. Suitable examples include, but are not limited to trimethylolpropane triacrylate, isomers of divinylbenzene, and ethylene glycol divinyl ether. These monomers are preferably used at 0-10% of the total weight of reactive species among the total of Class I fluid, Class II fluid, and reactive ionic liquid surfactant. Most preferably they are present as 0-2% of the total weight of the total of Class I fluid, Class II fluid, and reactive ionic liquid surfactant. In a preferred embodiment, reactive Class II fluid is essentially completely selected from the family of cross-linking agents, particularly if a high degree of toughness is required in the composite material produced after microemulsion polymerization.

The following cross-linking agents are useful:

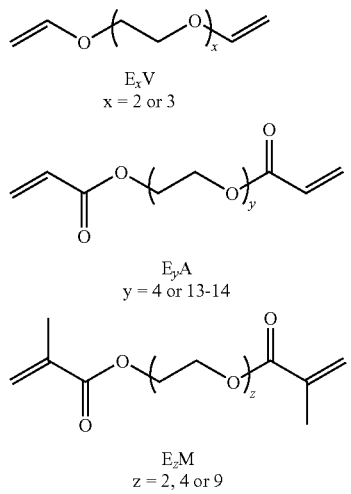

The following poly(ethyleneglycol) diacrylatesa re useful and are readily available for number average molecular weights of 258, 575, and 700 from the Aldrich Chemical Company:

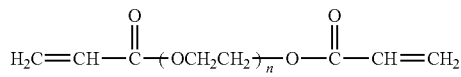

Similar diacrylates are easily synthesized from poly(ethyleneoxide) of any molecular weight by condensation with acrylchloride. The following poly(propyleneglycol) diacrylates are useful and are readily available for number average molecular weights of 540 and 900 from the Aldrich Chemical Company:

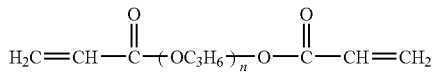

Similar diacrylates are easily synthesized from poly(propyleneoxide) of any molecular weight by condensation with acrylchloride. Other useful cross-linking agents include 1,4-di(acryloyl)piperazine, N,N'-bisacryloyl-1,2-dihydroxy-1,2-ethylenediamine, bis(2-acrylamidoethyl) disulfide, N,N'-diallyltartramide, hydroxy terminated ethylene glycol bis [pentakis(glycidyl allyl ether)]ether, 1,3-butanediol diacrylate, 4-butanediol diacrylate, 1,6-hexanediol diacrylate, ethylene glycol diacrylate, fluorescein O,O'-diacrylate, glycerol 1,3-diglycerolate diacrylate, pentaerythritol diacrylate monostearate, 1,6-hexanediol ethoxylate diacrylate, 1,6-hexanediol propoxylate diacrylate, 3-hydroxy-2,2-dimethylpropyl 3-hydroxy-2,2-dimethylpropionate diacrylate, bisphenol A ethoxylate diacrylate, bisphenol A glycerolate (1 glycerol/phenol) diacrylate, bisphenol A propoxylate diacrylate, bisphenol A propoxylate glycerolate diacrylate, di(ethylene glycol) diacrylate, neopentyl glycol diacrylate, propylene glycol glycerolate diacrylate, tetra(ethylene glycol) diacrylate, tri(propylene glycol) diacrylate, tri(propylene glycol) glycerolate diacrylate, tricyclo[5.2.1.0$^{2,6}$]decanedimethanol diacrylate, trimethylolpropane benzoate diacrylate, di(propylene glycol) allyl ether methacrylate, ethyleneglycoldimethacrylate, N,N'-(1,2-dihydroxyethylene)bis-acrylamide, N,N'-methylenebisacrylamide, N,N-bis-(2-chloro-allyl)-4-methyl-benzenesulfonamide, bis-(3-chloro-1,1-diphenyl-allyl)-amine, benzyl-bis-(2-(2-methylpropane-2-sulfonyl)-allyl)-amine, and L-aspartic acid diallyl ester p-toluenesulfonate salt. Many additional useful crosslinking agents can be synthesized by suitable condensation of acrylchloride or methacrylachloride with any suiablet diol, polyol, diamine, or polyamine.

The polymerization process is subsequently initiated with free radical initiators or with ultraviolet light. Free radical initiators of any sort may be used. Preferred initiators include acyl peroxides such as acetyl and benzoyl peroxides, alkyl peroxides such as cumyl and t-butyl peroxides, hydroperoxides such as t-butyl and zoate, azo compounds such as 2,2'-azobisisobutyronitrile and related azo compounds such as those disclosed by Nuyken and Kerber (*Makromol. Chem.*, 1978, 179, 2845) which are incorporated herein by reference, disulfides such as those disclosed by Sato, Abe, and Otsu (*Makromol. Chem.*, 1979, 180, 1165) which are incorporated herein by reference, tetrazenes such as those disclosed by Oda, Maeshima, and Sugiyama (*Makromol. Chem.*, 1978, 179, 2331), N2O4, persulfate, peroxides in combination with a reducing agent such as hydrogen peroxide in combination with ferrous ion, various organic peroxides in combination with ferrous ion as disclosed by Huyser (in Chapter 10 and pp. 314-330 of *Free Radical Chain Reactions*, Wiley, New York, 1970) which combinations are incorporated herein by reference, peroxides in combination with other reducing ions, such as $Cr^{+2}$, $V^{+2}$, $Ti^{+3}$, $Co^{+2}$, and $Cu^{+}$, combinations of acyl peroxides and reducing amines such as benzoyl peroxide and N,N-dialkylaniline and other combinations as disclosed by O'Driscoll, Lyons, and Patsiga (*J. Polym. Sci.*, 1965, A3, 1567) and by Morsi, Zaki, and El-Khyami (*Eur. Polym. J.*, 1977, 13, 851) which combinations are incorporated herein by reference, combinations of amines and acyl halides such as those disclosed by Gaha and Chaudhuri (*J. Polym. Sci. Polym. Lett. Ed.*, 1978, 16, 625) which combinations are incorporated herein by reference, combinations of peroxides and transition metal complexes such as cupric acetylacetonate and ammonium salts such as those disclosed by Ghosh and Maity (*Eur. Polym. J.*, 12, 855, 1978) and by Shahani and Indictor (*J. Polym. Sci. Polym. Chem. Ed.*, 1978, 16, 2683; *J. Polym. Sci. Polym. Chem. Ed.*, 16, 2997, 1978) which combinations are incorporated herein by reference, the combination of zinc chloride and azo compounds such as 2,2'-azoisobisbutyronitrile, the combination of inorganic reductants and inorganic oxidants such as $S_2O_8^{-2}$ in combination with $Fe^{+2}$, $S_2O_8^{-2}$ in combination with $S_2O_3^{-2}$, and other combinations such as those disclosed by Huyer (in Chapter 10 and pp. 314-330 of *Free Radical Chain Reactions*, Wiley, New York, 1970) and by Manickam, Singh, Venkatarao, and Subbaratnam (*Polymer*, 1979, 20, 917) which combinations are disclosed herein by reference, combinations of reductants such as $HSO_3^-$, $SO_3^{-2}$, $S_2O_3^{-2}$, and $S_2O_5^{-2}$ with oxidants such as $Ag^+$, $Cu^{+2}$, $Fe^{+3}$, $ClO_3^-$, and Hydrogen peroxide, the combination of $Ce^{+4}$4 with alcohols such as combinations disclosed by Mohantx, Parham, and Mahatma (*Euro. Polym. J.*, 1980, 16, 451) which are incorporated herein by reference, combinations of $V^{+5}$, $Cr^{+6}$, or $Mn^{+2}$ with organic components such as combinations disclosed by Nayak and Lenka (*J. Macromol. Sci. Rev. Macromol. Chem.*, 1980, C19, 83) which are incorporated herein by reference, the combination of tiol compounds such as theorem, thioglycolllic acid, and 2-mercaptoethanol with $Fe^{+3}$, $Ce^{+4}$, BrO3-, and $S_2O_8^{-2}$ such as disclosed by Pramanick and Chatterjee (*J. Polym. Sci. Polym. Chem. Ed.*, 1980, 18, 311) and by Misra and Dubey (*J. Polym. Sci. Polym. Chem. Ed.*, 1979, 17, 1391) which combinations are herein incorporated by reference, combinations of $Ce^{+4}$ and $V^{+5}$ with aldehydes and ketones as disclosed by Ahmed, Natarajan, and Anivaruddin (*Makromol. Chem.*, 1978, 179, 1193) which are incorporated herein by reference, combinations of $Mn^{+3}$ and permanganate with oxalic, malonic, and citric acids as disclosed by Kaliyamurthy, Elayaperumol, Balakrishnan, and Santappa (*Makromol. Chem.* 1979, 180, 1575) which are incorporated herein by reference, and combinations of organometallic derivatives of transition metals with organic halides as disclosed by Bamford (in Chapter 2 of *Reactivity, Mechanism and Structure in Polymer Chemistry*, Jenkins and Ledwith, Editors, Wiley-Interscience, New York, 1974) and by Ouchi, Taguchi, and Imoto (*J. Macromol. Sci. Chem.*, 1978, A12, 719) which are incorporated herein by reference. The components are chosen so that useful latexes, nanoporous materials, or microporous materials are obtained.

These latexes and porous materials may be used as obtained or they may be further treated to make them more useful as materials. For example, the polymers obtained, including the latexes and porous materials of the present invention, may be washed to remove unwanted soluble materials, such as salt or unreacted monomer, using methods well known in the art such as dialysis and constant volume membrane filtration methods. The polymers and latexes may be concentrated to facilitate their storage, transportation, and use by methods well known in the art such as membrane dialysis, rotoevaporatoin, and other well known solvent stripping methods. The polymers may be precipitated and recovered as solids to facilitate their storage, transportation, and use by methods well know in the art. Such methods include, but are not restricted to pH shifting, solvent shifting (flooding with a poor or non-solvent) spray drying, freeze drying, ion exchange (flooding with an anion solution that will modify the polymer solubility.

Composite Materials. For the lexigraphic purposes of the instant claims, the expression "composite materials" encompasses all of the invention materials of the instant claims, including suspensions of latex particle obtained by microemulsion polymerization in oil-in-water microemulsion domains, suspensions of inverse latex particles obtained by microemulsion polymerization in water-in-oil microemulsion domains, hydro gels, solvogels, and all materials obtained by polymerizing in irregular bicontinuous microemulsion domains. This terms also includes all of the porous materials already described above. Furthermore, this term includes all of the materials obtained by the subsequently described "ion exchange treatments", "solvent shifting", and "templating treatments".

Ion Exchange Treatments

Certain of the materials of the present invention are prepared in an initial stage with reactive ionic liquid surfactants of the form $(C^{+n})_m (A^{-m})_n$ as described above for structure III. It may be advantageous to ion exchange either a counter ion species in order to drive a structural transition from one material form to another. For example, when the cation species is an imidazolium species anchored to the copolymeric material of the invention, it may be possible to dramatically alter the solubility of the imidazolium group by changing the anions. For example, if $Br^-$, or $Cl^-$ are the anionic species, resulting in substantial water solubility of the imidazolium group, replacement with $BF_4-$ will result in lower water solubility, and likely will induce structural change throughout the composite material. Instead, if the $PF_6^-$ anion is exchanged for halide species, the imidazolium group will become virtually insoluble, and dramatic morphological transitions are thereby induce. We show in the examples that such transitions include a spinodal type of decomposition involving dimensional shrinking and the formation of nanoscale to microscale pores, open cell and closed cell.

Ion exchange treatments can be done by any convenient approach. If an open cell structure exists, the most effective approach is to pass a solution containing the new ion through the material, if such a filtration type of flow is feasible. Alternatively, it is very effective to simply bathe the material in a solution of the new ion to be exchanged. The time required for sufficient ion exchange will depend on whether only diffusional ionic transport is possible. Convective flow results in faster ion exchange, but diffusional transport suffices.

Solvent Shifting Treatments

Morphological changes in the composite materials of the present invention can also be induced by solvent changes or solvent shifting. Exchanging a good solvent for the copolymer, particularly for the copolymerized ionic liquid surfactant residue, as a replacement for a mediocre or poor solvent will induce salvation of the copolymers. This exchange can result in swelling and in the composite material becoming a solvogel. Conversely, exchanging a poor solvent for a good solvent may induce shrinkage, desolvation, and other structural transitions resulting in local microphase changes. Such solvent changes can result in the transformation of solvogel materials into closed cell and open cell porous materials.

Templating Treatments

Various ion exchange and solvent shifting treatments can transform solvogel composite materials of the present invention into closed cell and open cell composite materials. In the case of composite materials having an open cell structure, one can fill these open cells with almost any alternative inorganic or organic phase.

An open cell porous material of the present invention can be perfused with metal alkoxides in the presence of a small amount of water and acid or alkali as a catalyst. Under such conditions, amorphous metal hydroxyl/oxides sequentially form by hydrolysis of the metal alkoxides, ultimately leaving a new continuous phase of metal oxide. Heating can drive the hydrolysis reactions to completion. Most metal oxides thusly formed are generally amorphous. However, if one pyrolyzes away the porous copolymer phase, say be heating in the presence of air at temperatures of 500 to 800° C., one can increase the crystallinity of the metal oxide phase, while pyrolyzing away the original open cell copolymer phase. Suitable alkoxides are available commercially, and include TEOS, tetraethylorthosilica, $Ti(OCH_2CH_3)_4$, and tetraethylorthotitania. Many, many varied metal alkoxides are available commercially and include aluminum (III) n-butoxide, aluminum (III) t-butoxide, aluminum (III) isopropoxide, aluminum (III) phenoxide, antimony (III) n-butoxide, antimony (III) isopropoxide, antimony (III) methoxide, bisopropoxide, bismuth (III) isopropoxide, copper (II) ethoxide, copper (II) isoproxide, copper (II) methoxide, galium (III) ethoxide, gallium (III) isopropoxide, germanium (IV) n-butoxide, germanium (IV) ethoxide, germanium (IV) isopropoxide, germanium (IV) methoxide, hafnium (IV) n-butoxide, hafnium (IV) t-butoxide, hafnium (IV) ethoxide, hafnium (IV) isopropoxide isopropylate, indium (III) isopropoxide, iron (III) ethoxide, iron (III) isopropoxide, iron (II) methoxide, iron (III) methoxide, lanthanum (III) isopropoxide, lithium phenoxide, manganese (II) methoxide, neodymium (III) isopropoxide, niobium (V) ethoxide, niobium (V) phenoxide, strontium (II) isopropoxide, tantalum (V) ethoxide, tantalum (V) methoxide, tellurium (IV) isopropoxide, tin (II) ethoxide, tin (IV) isopropoxide, tin (II) methoxide, titanium (IV) ethoxide, titanium (IV) isopropoxide, titanium (IV) methoxide, vanadium (V) triisopropoxide oxide, yttrium (III) isopropoxide, zinc t-butoxide, zinc isopropoxide, zirconium (IV) t-butoxide, and zirconium (IV) isopropoxide isopropylate. A great many double metal alkoxides are commercially available as well.

Elemental metals may be used to fill the pores of open cell copolymers of the present invention. One approach is to prepare nanoparticulate metal as a dispersion and to perfuse the porous copolymer with such a dispersion, dry, mildly sinter, and repeatedly perfuse, dry, and mildly sinter. After no more metal nanoparticles can be perfused, one drys, and effects sintering with thermal activation to induce transformation of the separate particles into a continuous metallic mass. Alternatively, one can simply perfuse metal oxide particles through the material and chemically reduce the oxide to elemental metal. Alternatively, one may place a slab of open cell polymer on an electrode, perfusing the pores with oxidize metal solution, followed by electrochemical reduction of the metal ions, until the pores have been filled. The pores may also be filled with semiconductor compounds by perfusing with nanoparticulate semiconductors or be growing a semiconductor phase electrochemically (bottom-up) as described above for metal reduction. Sparingly soluble inorganic phases may be deposited by the nanoparticle perfusion approach, followed by thermal sintering or chemical annealing.

The intended use of such composite materials may require both the newly deposited metal or metal oxide or other metal compound phase and the original templating copolymer phase. Retention of the original copolymer phase, particularly if cross-linked, will yield a composite material with hybrid polymeric and metallic properties. Retention of a cross-linked copolymer phase will provide ample flexibility and toughness that may greatly exceed the mechanical moduli obtained with the metal oxide or metal phase alone.

If the perfused metal or metal oxide phase alone is desired, the templating copolymer phase may be removed by pyrolysis. If the copolymer phase is not cross-linked it can be removed by dissolution, if a sufficiently good solvent exists for the copolymer.

When it is advantageous the open cell pores of composite materials of the present invention may be filled with anther organic phase of any needed property. The pores may be perfused with new polymer phase solutions, followed by drying, and cyclical perfusion and drying steps until the pores are filled with the new polymer. Alternatively, the pores may be perfused with a prepolymer solution or mixture of monomers, followed by bulk (channel) polymerization.

The templating described here has been extensively developed for application to photonic crystal templates wherein beads are arranged in random or long range crystalline ordered arrays. The templating of the present invention is much more extensively applicable.

Bactericidal Polymers

In those composite materials of the present invention that utilize ionic liquid surfactants wherein the cationic components of the surfactants comprise a reactive double bond, the resulting copolymer of the composite material will be intrinsically antimicrobial. Cationic surfactants have long been well appreciated as being antimicrobial, and more recently it has become generally known that oligomers and polymers of cationic groups exhibit antimicrobial activity. Many of the composite materials of the present invention, therefore, will comprise copolymers that are intrinsically antimicrobial.

Porous Membranes and Filters

Certain of the ion exchange treatment and solvent shifting treatments of the composite materials of the present invention transform solvogels of the present invention into porous membranes and filters. The porosity of such membranes and filters can be tuned from a lower limit of scores of nanometers up to tens of microns by suitably modifying the cross-linking density and Class II fluid monomers of the present invention.

The solvogels of the present invention can usefully serve as nanoscopic filters, when operated at high pressure, for separating molecules and polymer segments. These solvogels may be used in electrophoretic separation of polymer and molecular mixtures, in the same way that acrylamide gels have long been used in physical biochemistry to separate nucleotides and other biopolymers.

Advanced Composite Materials

The ionic exchange and solvent shifting treatments make it possible to produce a variety of advanced composite materials having different applications. Some of these applications are articulated in the following paragraphs, although this list is not meant to be exhaustive of all advanced composite materials of the present invention.

Fire Resistant Materials

Since reactive ionic liquid surfactants are used in relatively high proportion in the composite materials of the present invention, the composite materials of the present invention often have organic phases having exceptionally high charge densities. These charges impart intrinsic ignition resistance to the copolymers in which they are incorporated, and these same charges decrease the combustibility of these copolymers.

When halide containing and phosphorous containing counter ions are included in the composite materials of the present invention, the inherent combustion resistance is increased further. It is well known that chemically incorporating phosphourous and halogens into polymer formulations increase their fire resistance. Hence, many of the composite materials of the present invention are expected to exhibit remarkable fire resistance.

The monomers and ionic liquid surfactants of the composite materials of the present invention may incorporate perfluorocarbon groups of various types, and thereby increase further the intrinsic ignition and combustion resistance of the composite materials of the present invention.

Thermally Insulating Materials

The open cell composite materials of the present invention can be sealed and used as thermally insulting materials. The closed cell materials of the present materials may be used as thermally insulating materials.

Catalyst Supports

The composite materials of the present invention can be formed into porous materials having various charged groups readily accessible on the cell walls. Such porous to materials my be imbibed with catalytic particles. Such porous materials may easily be modified so as to form catalytic particles in situ. The combined porosity and ease of supporting catalytic particles make the porous composite materials excellent candidates for catalyst supports. The thermal stability described earlier greatly contributes to being able to successfully use such materials as catalyst supports.

Thermally Conductive Materials

The composite materials of the present invention can be formed into porous materials, and these pores may be filled with metal or conducting polymer phases as described above. These thermally conductive materials may be used to dissipate heat in electronic and photonic applications.

High κ Dielectric Materials

Since reactive ionic liquid surfactants are used in relatively high proportion in the composite materials of the present invention, the composite materials of the present invention often have organic phases having exceptionally high charge densities. These high charge densities provide relatively high dielectric permittivity, competitive with permittivities obtained with nanoparticle based mixed metal oxides. Since the composite materials of the present invention are soluble in certain solvents, the deposition of such polymers by inkjet writing methods seem straightforward.

UV Resistant Composites

The major impediment to using polymers for structural applications in high altitude and outer space applications is that most polymers eventually degrade severely when subjected to UV irradiation. The composite materials of the present invention can be designed to have 50% by volume copolymer of the present invention. The pores of such a copolymer may be filled with elemental aluminum, and the exterior can be coated with naoparticulate gold. The gold coating prevents UV from damaging the copolymer, and the tough structural composite provides many metallic properties common to the original aluminum.

Drug and Chemical Delivery

The pore forming composite materials of the present invention can be fabricated as particles and as webs. These particles and webs can be transformed into a porous structure and used to imbibe a drug substance or chemical for delivery, by perfusing with particulate suspensions or by perfusing with drug or chemical solutions. The exterior pores can be closed by suitable treatment with solvent.

The reversible porosity of the composite materials of the present invention present opportunities for a new class of filtration devices that can throttle flow according to ion content and according to solvent composition.

The composite materials of the present invention can be used as film and as particle delivery carriers. Beads of our invention can be filled with chemical and drugs, treated to close exterior pores, and used as controlled delivery vehicles.

Porous Beads

Porous beads in the 1-100 micron diameter range may be synthesized by a limited coalescence technique where the pore forming composite material of the present invention is emulsified in an inert solvent, such as perfluorooctane. Nanoparticulate silica is used to stabilize Pickering emulsions of the microemulsion in the perfluoroctane. The emulsion is emulsified by high shear stirring to a droplet diameter much smaller than the actual aim. Only enough nanoparticulate silica is added so as to stabilize the aim diameter for the solvogel polymerized microemulsion particles. These particles are carried to an aqueous phase by flooding with solvent, followed by phase separation of the perfluorocarbon solvent. The beads are then transformed into a porous state by ionic exchange. Such beads can be used to undergo transformation to pores. When used as packing for a gel permeation column, one can design a chromatography algorithm wherein the tortuosity of the beads can be varied with ion and solvent content in the eluent.

The following examples are to be considered illustrative of the present invention and are not intended to be exhaustive of all possible embodiments of the present invention.

EXAMPLES

Synthesis of Ionic Liquid Surfactants

Example 1

Synthesis of 1-dodecyl-3-methylimidazolium bromide. A mixture of 1-bromododecane (12.4 g, 50 mmol) and 1-methylimidazole (4.1 µg, 50 mmol) was stirred at 75° C. for 24 h. The viscous liquid was washed with ethyl acetate several times and heated at 85° C. under vacuum for 24 h to produce waxy 1-dodecyl-3-methylimidazolium bromide (15.64 g, 83%). $^1$H NMR (400 MHz, CDCl$_3$): 10.61 (1H, m, N—CH—N), 7.25-7.34 (2H, s, N—CH=CH—N), 4.32-4.30 (2H, t, N—CH$_2$(CH$_2$)$_{10}$CH$_3$), 4.12 (3H, s, N—CH$_3$), 1.91-1.90 (2H, m, N—CH$_2$(CH$_2$)$_{10}$CH$_3$), 1.32-1.23 (18H, m, N—CH$_2$(CH$_2$)$_{10}$CH$_3$), 0.87-0.84 (3H, t, N—CH$_2$(CH$_2$)$_{10}$CH$_3$). Elemental analysis: Calculated C$_{16}$H$_{32}$BrN$_2$: C, 57.28%, H, 9.71%, N, 8.43%; Found: C, 56.62%, H, 9.49%, N, 8.35%. mp: 39.7° C.

Scheme 1

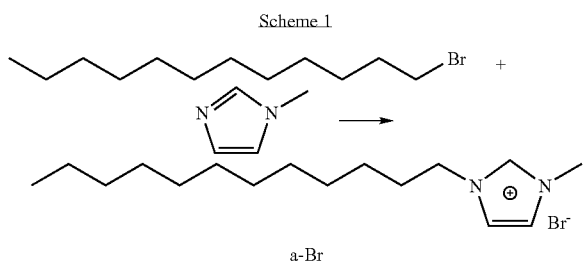

a-Br

Example 2

Synthesis of 1-dodecyl-3-methylimidazolium tetrafluoroborate. 1-Dodecyl-3-methylimidazolium bromide (6.62 g, 20 mmol, a-Br) was dissolved in 50 mL of dry acetonitrile and stirred with NaBF$_4$ (2.75 g, 25 mol) at 40° C. After the mixture was stirred for 48 h, the sodium bromide precipitate was removed by filtration and the filtrate was concentrated. The concentrated filtrate was diluted with methylene chloride (300 mL) and filtered through a short column of silica gel. The Br-concentration was checked qualitatively by the formation of AgCl after adding of silver nitrate (AgNO$_3$) into the decanted water. The resulting ionic liquid 1-dodecyl-3-methylimidazolium tetrafluoroborate was heated at 80° C. under vacuum for 12 h. (5.49 g, 81% yield). $^1$H NMR (400 MHz, CDCl$_3$): 0.84-0.88 (3H), 1.24-1.31 (18 H), 1.84-1.87 (2 H), 3.95 (3H), 4.14-4.18 (2H), 7.25-7.30 (2H), 8.84 (1H). mp: 31.1° C.

Scheme 2

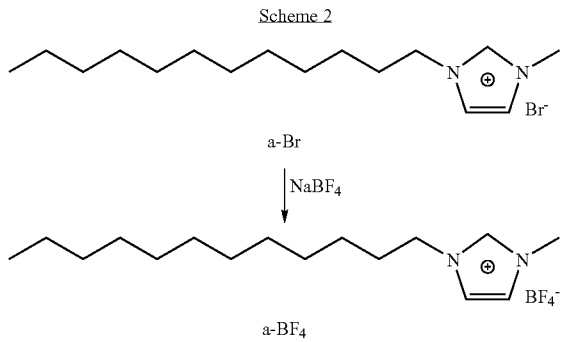

a-Br

↓ NaBF$_4$ a-BF$_4$

Example 3

Synthesis of 1-acryloylundecyl-3-methylimidazolium bromide. The intermediate 11-bromoundecylacrylate is first synthesized as shown in Scheme 3. 11-Bromoundecanol (10.00 g, 40 mmol) was dissolved in 40 ml of dry tetrahydrofuran (THF) in a two-necked round bottom flask. The flask was cooled in an ice-bath and triethylamine (5.13 mL, 40 mmol) in THF (40 mL) was added to the stirring solution. Acryloyl chloride (3.65 g, 40 mmol) dissolved in 40 ml of THF was added dropwise to the stirring solution over a period of 15 min under N$_2$ atmosphere. The mixture was further stirred for 2 days at room temperature and was filtered. The filtrate was washed with 2% sodium bicarbonate solution to remove any unreacted acid chloride and dried over anhydrous MgSO$_4$. The dried solution was filtered and the filtrate was passed through a short column of neutral alumina, using CH$_2$Cl$_2$ as the light yellow liquid (yield 10.58 g, 87%). $^1$H NMR (400 MHz, CDCl$_3$): 6.37-6.36 (1H, m, CH$_2$=CH), 6.15-6.12 (1H, m, CH$_2$=CH), 5.81-5.79 (1H, m, CH$_2$=CH), 4.16-4.12 (2H, t, —OCOCH$_2$), 1.85-1.82 (2H, m, BrCH$_2$CH$_2$—), 1.66-1.64 (2H, m, —OCOCH$_2$CH$_2$), 1.42-1.27 (14H, m, —CH$_2$CH$_2$(CH$_2$)$_7$CH$_2$CH$_2$—).

This intermediate is then quaternarized with 3-methylimidazole. Under N$_2$ atmosphere, a mixture of 11-bromoundecylacrylate (6.08 g, 20 mmol) and 1-methylimidazole (1.64 g, 20 mmol) and a small amount of 2,6-di-tert-butyl-4-methylphenol (inhibitor) was stirred at 40° C. for 48 h, and yielded a viscous liquid. The viscous liquid was purified by the precipitation method with diethyl ether to obtain yellow viscous liquid 1-(2-acryloyloxyundecyl)-3-methylimidazolium bromide. The viscous liquid was dried under vacuum at room temperature as the white waxy solid (5.73 g, 74%). $^1$H NMR (400 MHz, CDCl$_3$): 10.66 (1H, m, N—CH—N), 7.34-7.25 (2H, s, N—CH=CH—N), 6.36-6.35 (1H, m, CH$_2$=CH), 6.14-6.11 (1H, m, CH$_2$=CH), 5.81-5.79 (1H, m, CH$_2$=CH), 4.30-4.29 (2H, t, N—CH$_2$(CH$_2$)$_{10}$O—), 4.11 (3H, s, N—CH$_3$), 1.90-1.82 (2H, t, N—CH$_2$(CH$_2$)$_{10}$O—), 1.66-1.62 (2H, m, —OCOCH$_2$CH$_2$), 1.30-1.24 (14H, m, —CH$_2$CH$_2$(CH$_2$)$_7$CH$_2$CH$_2$—). Elemental analysis: Calculated: C$_{18}$H$_{32}$BrN$_2$O$_2$, C, 55.67%; H, 8.31%; N, 7.21%. Found: C, 55.22%, H, 7.79%, N, 7.35%. mp: 37.2° C.

Scheme 3

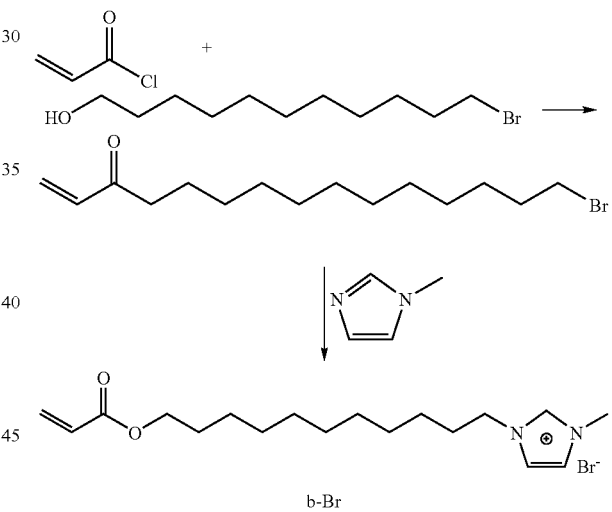

b-Br

Example 4

Synthesis of 1-acryloylundecyl-3-methylimidazolium tetrafluoroborate. This derivative is derived from 1-acryloylundecyl-3-methylimidazolium Bromide (b-Br) (synthesized in Example 3) by ion exchange. First, b-Br (7.74 g, 20 mmol) was dissolved in 50 mL of dry acetonitrile and stirred with NaBF$_4$ (2.75 g, 25 mol) at room temperature. After the mixture was stirred for 48 h under N$_2$ atmosphere, the sodium bromide precipitate was removed by filtration and the filtrate was concentrated. The concentrated filtrate was diluted with methylene chloride (300 mL) and filtered through a short column of silica gel. The Br$^-$ concentration was checked qualitatively by the formation of AgCl after adding of silver nitrate (AgNO$_3$) into the decanted water. The resulting ionic liquid 1-(2-acryloyloxyundecyl)-3-methylimidazolium tetrafluoroborate was dried under vacuum for 24 h as the white waxy solid. (6.24 g, 79% yield). $^1$H NMR (400 MHz, CDCl$_3$): 8.78 (1H, m, N—CH—N), 7.34-7.25 (2H, s, N—CH=CH—N), 6.36-6.35 (1H, m, CH$_2$=CH), 6.14-6.11 (1H, m, CH$_2$=CH), 5.81-5.79 (1H, m, CH$_2$=CH), 4.15-4.10 (2H, t, N—CH$_2$(CH$_2$)$_{10}$O—), 3.99 (3H, s, N—CH$_3$), 1.85-1.84 (2H, t, N—CH$_2$(CH$_2$)$_{10}$O—), 1.66-1.62 (2H, m, —OCOCH$_2$CH$_2$), 1.30-1.24 (14H, m, —CH$_2$CH$_2$(CH$_2$)$_7$CH$_2$CH$_2$—). Elemental Analysis Calculated: C$_{18}$H$_{32}$BF$_4$N$_2$O$_2$, C, 54.70%; H, 8.16%; N, 7.09%. Found: C, 54.22%, H, 7.85%, N, 7.35%. mp: 31.8° C.

Example 5

2-Ethylhexyl-6'-pyridiniumhexylmaleate, bromide salt. (2-6mc6Br). Maleic anhydride (0.20 mol) and 2-ethylhexanol (0.20 mol) are placed in a 500 ml round-bottomed flask fitted with a reflux condenser. The latter is placed in an oil bath at 80° C. for 20 h and is stirred magnetically. The product is used without purification for the next step. 2-Ethylhexyl monoester maleic acid (19 mmol) is dissolved in dry dichloromethane (DCM) (150 ml) in a round-bottomed flask fitted with a drying tube and is cooled to 0° C. while stirred magnetically. Then, DCC (0.019 mol), DMAP (4.0 mmol) and bromohexanol 0.02 mol) are added. The reaction is allowed to come to room temperature over 4 h. The reaction is then filtered to remove the dicyclohexylurea formed. The filtrate is then washed with HCl (10% aqueous solution, 2 times with 150 ml), and saturated NaHCO$_3$ solution (2 times 150 ml) and finally deionized water (once with 150 ml). The organic layer is separated, dried over CaCl$_2$, and the solvent is removed. The desired product is separated from impurities by flash column chromatography, using silica as the stationary phase and a mixture of DCM and petroleum ether 40-60° (80:20) as eluent. Bromohexyl 2-ethylhexyl maleate (4.5 mmol) and pyridine (22 mmol) are mixed together in a round-bottomed flask fitted with a condenser and a magnetic stirrer. The mixture is reacted at 60° C. for 3 days. The reaction is stopped. Diethylether is added to precipitate the product and to remove the excess pyridine.

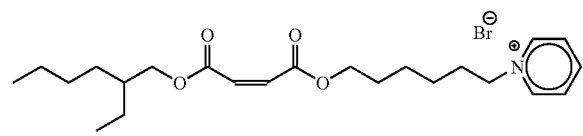

2-6mc6Br

Example 6

Synthesis of 11-bromoundecylacrylatetrimethyl ammonium 2-acrylamido-2-methyl-1-propanesulfonpnate (IV-6-a). 2-Acrylamido-2-methyl-1-propanesulfonic acid is converted to the Ag$^+$ salt by reacting a stoichiometric amount of the sulfonic acid with silver oxide (Ag$_2$O).

The intermediate 11-bromoundecylacrylate is first synthesized as shown in Scheme 3 and described in Example 3. 11-Bromoundecylacrylate (2.0 g, 6.55×10$^{-3}$ mol), trimethyl (2.40 g, 3.9×10$^{-2}$ mol), and hydroquinone (0.03 g) are placed in a round-bottom flask fitted with a condenser. The setup is immersed in an oil bath and vigorously stirred at 50° C. for 6 h. To this whitish suspension 150 ml of diethyl ether is added and the reaction is carried out for a total of 72 h, yielding a white suspension. The product is filtered and washed several times with diethyl ether. The reactive ionic liquid surfactant is vacuum-dried overnight and is then recrystallized from hot ethyl acetate (100 ml), filtered, and dried under vacuum overnight to yield a white crystalline (11-acryloyloxyundecyl) trimethyl ammonium bromide (AUTMAB) with melting point 128° C. The silver sulfonate is titrated stoichiometrically with the bromide (AUTMAB) in methanol to produce the desired salt. The precipitated AgBr is filtered out, and the desired product is obtained by drying the filtrate.

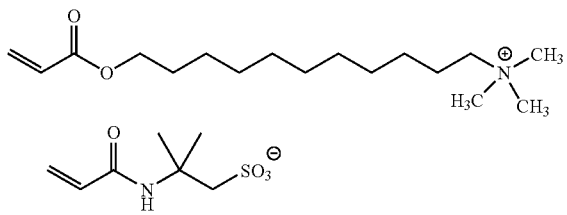

IV-6-a

Example 7

Synthesis of 11-bromoundecylacrylatedimethyl(triethylammonium-2-ethylammonium dibromide (PDQI). The intermediate 11-bromoundecylacrylate is first synthesized as shown in Scheme 3 and described in Example 3. This 11-bromoundecyl acrylate (5.86 g, 0.02 mol) is mixed with N,N,N',N'-tetramethylethylenediamine (10.0 g, 0.09 mol) along with a small amount of MEHQ (methyletherhydroquinone) to suppress polymerization and this mixture is stirred in a round-bottomed flask at 50° C. for 2 days. Diethyl ether is added to precipitate a yellow solid, and the mixture is chilled in dry ice and washed several times with ether. The solids are filtered under nitrogen and stored in a dessicator. This quaternary intermediate (5.5 g, 0.012 mol) is dissolved in acetone (10 ml) in a round-bottomed flask fitted with a drying tube. The solution is cooled in ice. An excess of chilled bomomethane (3.24 g, 0.034 mol) in diethyl ether (18 ml) is added and the solution is stirred for 2 days. Addition of ether precipitates a white solid. The precipitate is filtered and washed with ether, and then the precipitate is reprecipitated from methanol solution by adding ether. A yield of about 3.2 g (49%) is obtained. The product PDQI melts over 70-71° C. PDQI is C$^{+2}$(A$^{-1}$)$_2$ according to structure III:

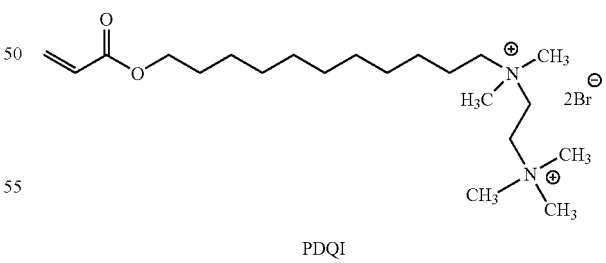

PDQI

Microemulsions Stabilized by Ionic Liquid Surfactants

Example 8

Figure 3:
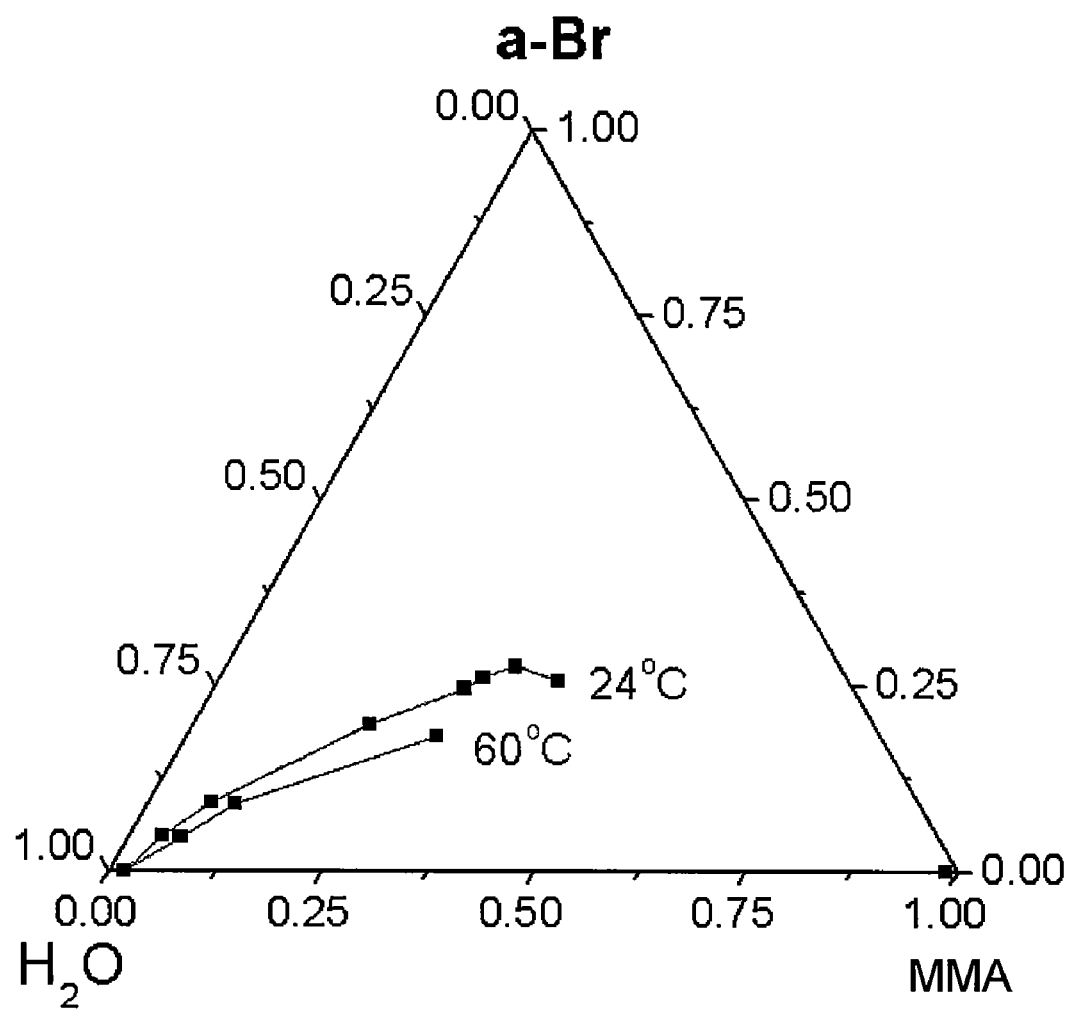

A partial phase diagram of the ternary system a-Br/water/MMA (methylmethacrylate) was mapped by the procedures described above at 24° C. and 60° C. This partial phase diagram is illustrated in FIG. 3. The regions to the left of the experimental partial boundaries and extending to the a-Br-water axis are single-phase microemulsion domains. The regions immediately to the right of these boundary segments are multiphase emulsion domains. The compositions represented by the microemulsion domains in this figure, at both 24° C. and 60° C., may be polymerized with suitable initiation to produce latexes or gel-like solid materials.

Example 9

Figure 4:
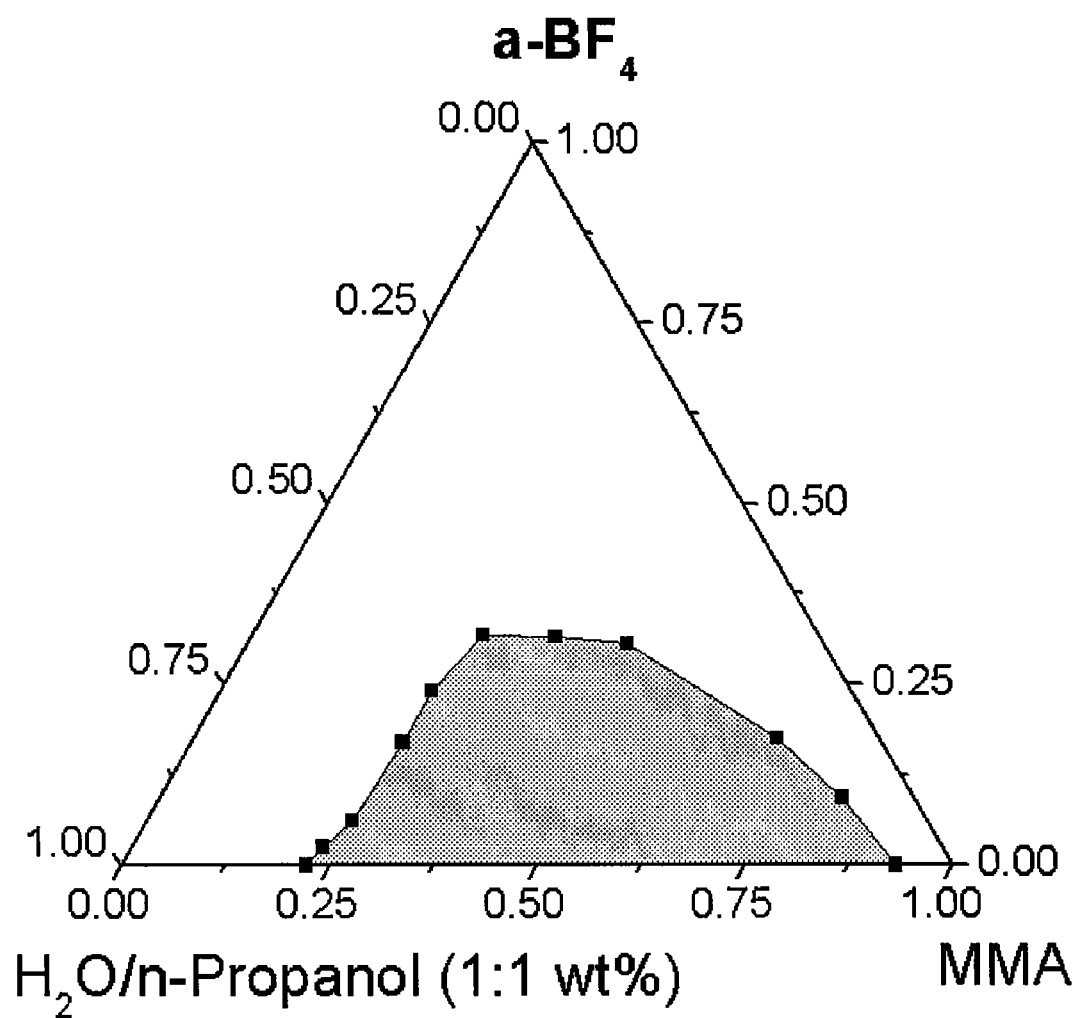
FIG. 4. Partial ternary phase diagram of the a-BF$_4$/water:isopropanol (1:1)/MMA system at 24° C. The domain areas to the left of the indicated partial boundaries are single phase microemulsion domains. Multiphase emulsion domains lie immediately to the right of the partial boundaries.

A partial phase diagram of the ternary system b-BF$_4$/water:propanol (1:1)/MMA (methylmethacrylate) was mapped by the procedures described above at 24° C. This partial phase diagram is illustrated in FIG. 4. The region below 50% by weight b-BF$_4$ and outside of the shaded multiphase emulsion domain is a microemulsion domain. The regions immediately to the right of these boundary segments are multiphase emulsion domains. The compositions represented by the microemulsion domains in this figure, at both 24° C. and 60° C., may be polymerized with suitable initiation to produce latexes, gel-like solid materials, and low water content solid composites.

Example 10

Figure 5:
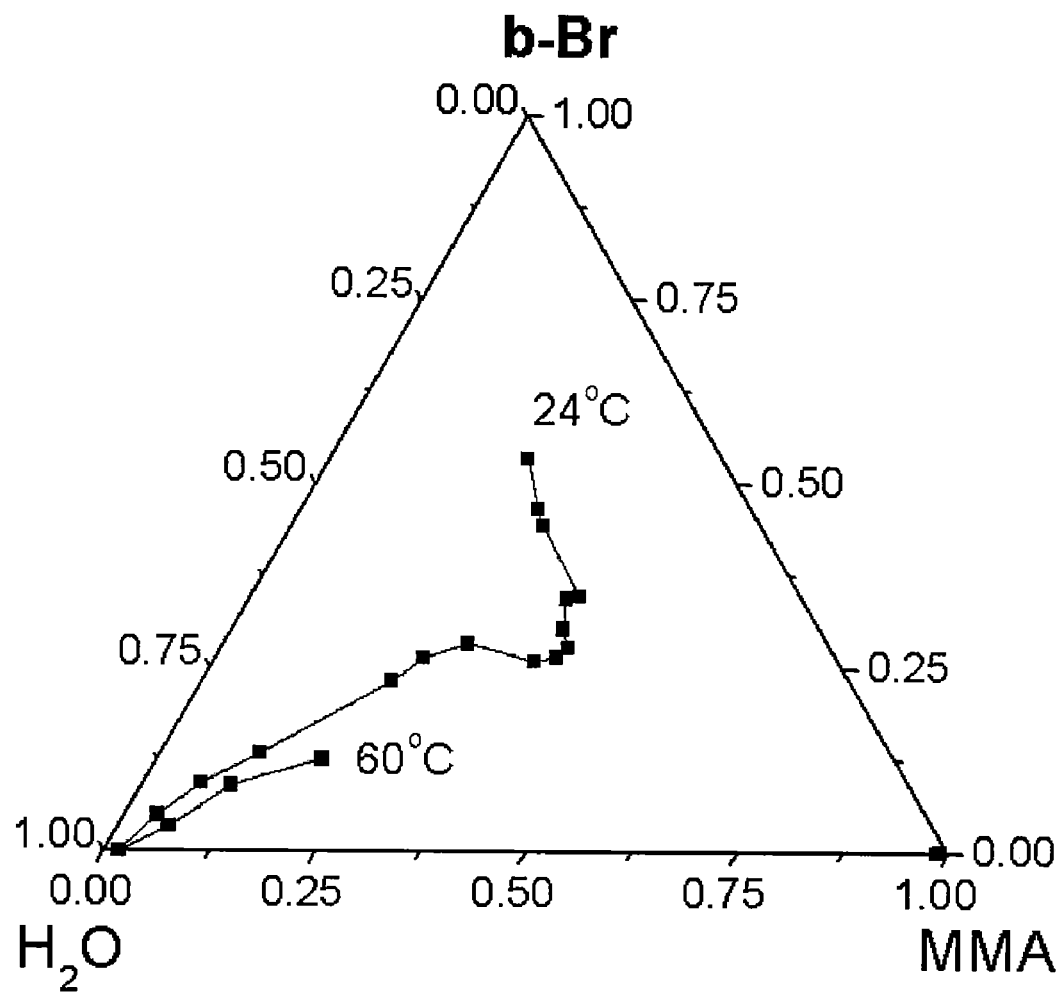
FIG. 5. Partial ternary phase diagram of b-Br/water/MMA system at 24° C. and 60° C. The domain areas to the left of the indicated partial boundaries are single phase microemulsion domains. Multiphase emulsion domains lie immediately to the right of the partial boundaries.

A partial phase diagram of the ternary system b-Br/water/MMA was mapped by the procedures described above at 24° C. and at 60° C. This partial phase diagram is illustrated in FIG. 5. The regions to the left of the experimental partial boundaries and extending to the b-Br-water axis are single-phase microemulsion domains. The regions immediately to the right of these boundary segments are multiphase emulsion domains. The compositions represented by the microemulsion domains in this figure, at both 24° C. and 60° C., may be polymerized with suitable initiation to produce latexes or gel-like solid materials.

Latexes Derived by Microemulsion Polymerization of Ionic Liquid Surfactant Stabilized Microemulsions

Example 11

Figure 6:
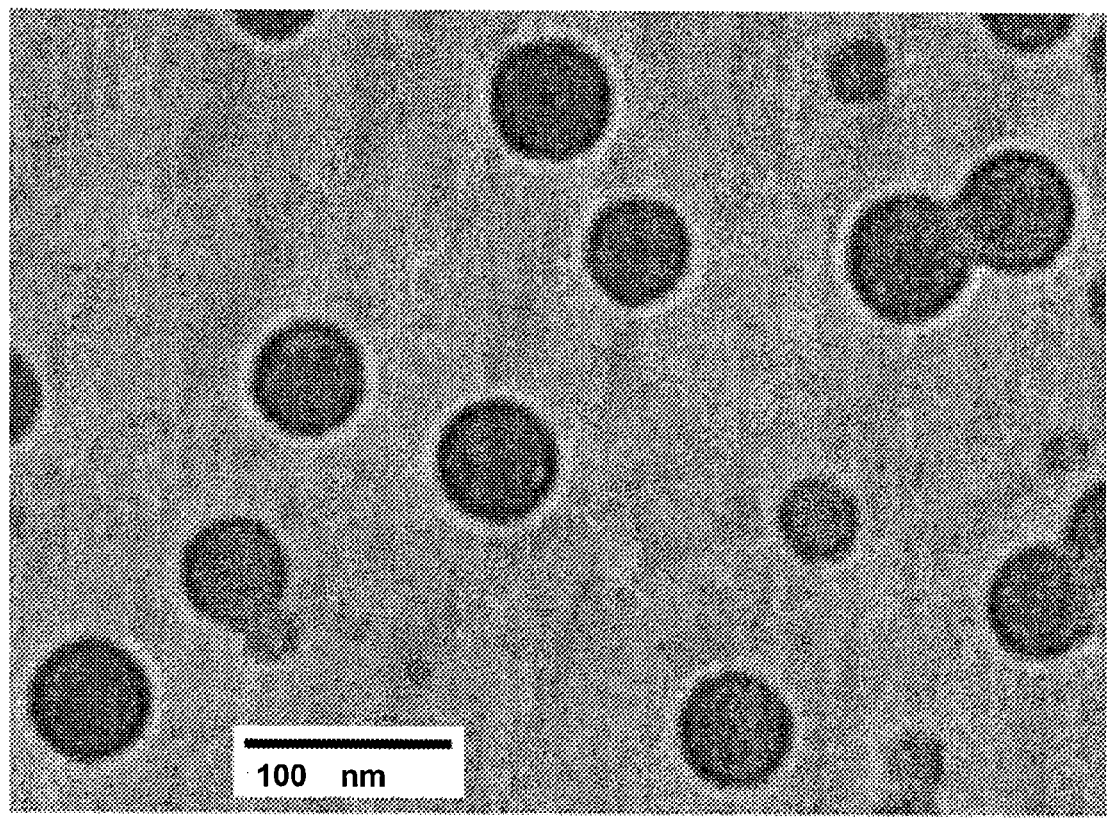
FIG. 6. TEM of latexes of the present invention produced by microemulsion polymerization in the a-Br/MMA/H2O system.

Bulk microemulsion polymerization in the a-Br/MMA/H$_2$O (0.04/0.04/0.92) system was initiated by AIBN (at 0.5% relative to monomer weight) at 60° C. However, turbidity from particle aggregation could be observed during the polymerization. The polymerization produced nearly monodisperse polymer latexes with diameters of about 50 nm. A TEM of these latexes is illustrated in FIG. 6.

Example 12

Figure 7:
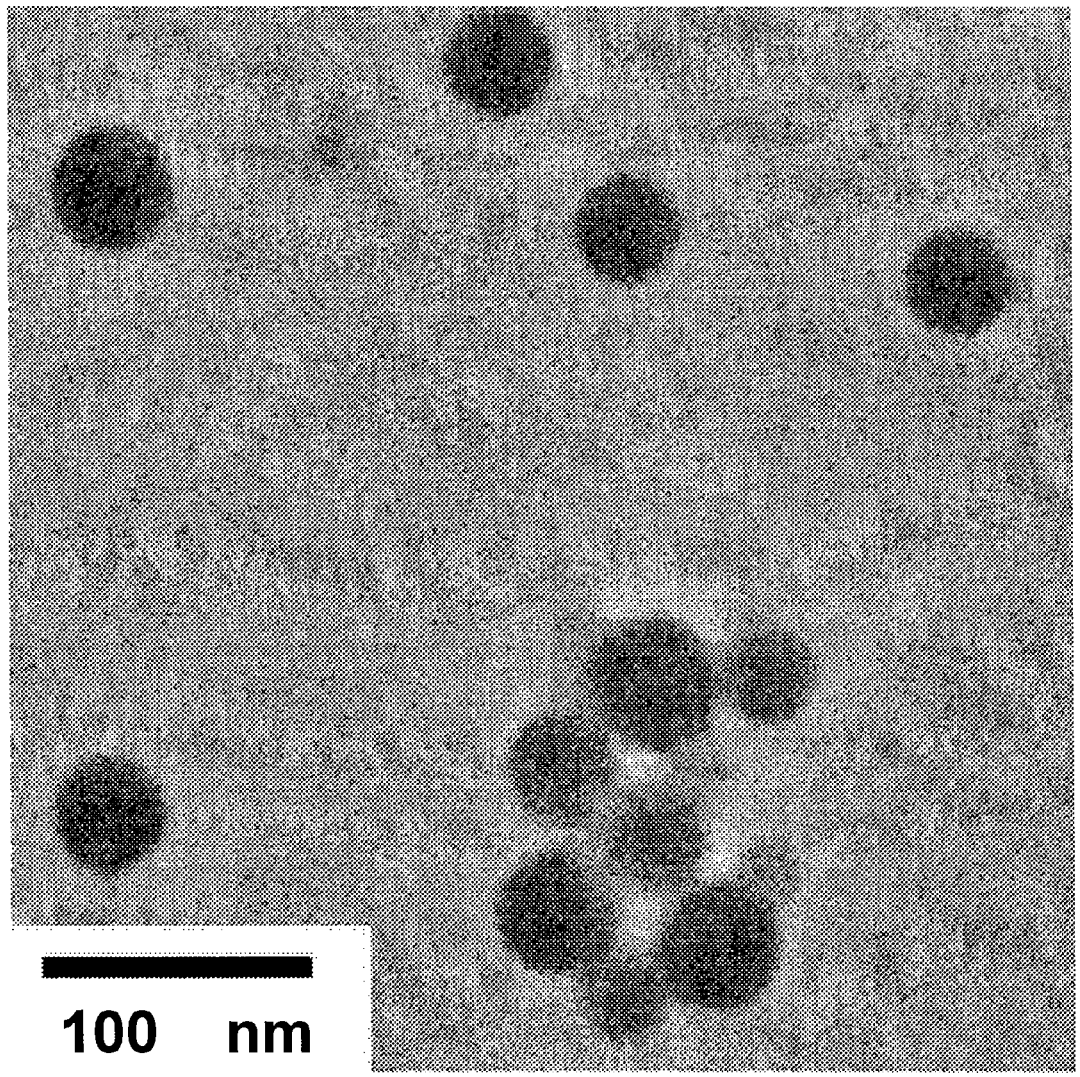
FIG. 7. TEM of latexes of the present invention produced by microemulsion polymerization in the b-Br/MMA/H2O system.
Figure 8:
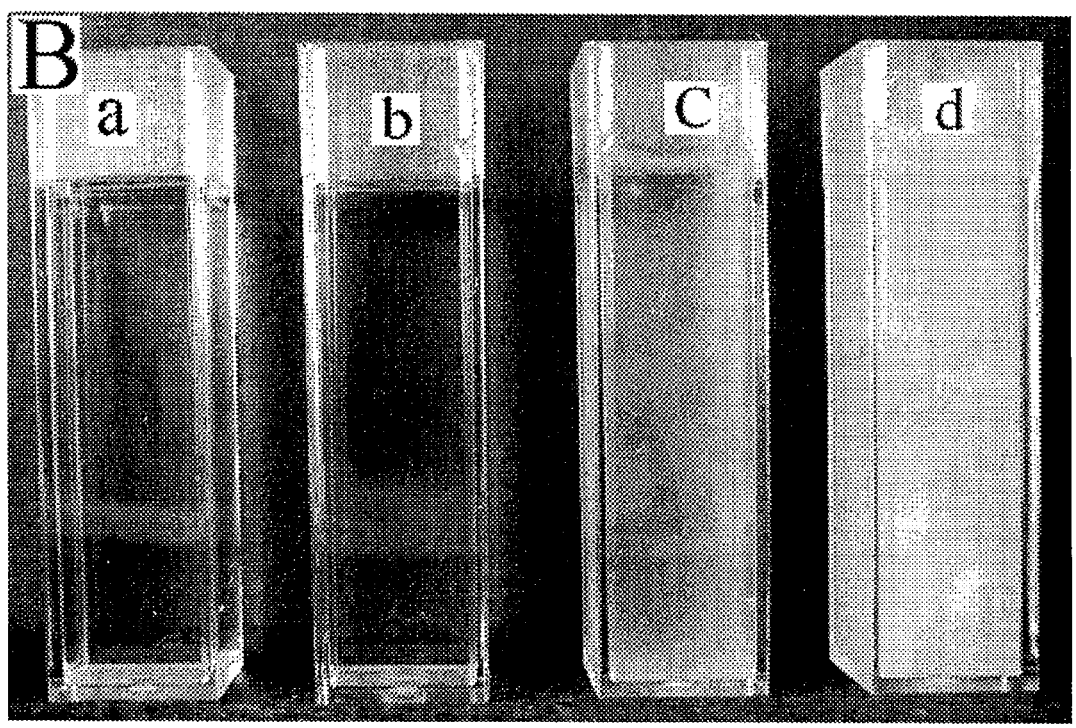
FIG. 8. Photograph showing variation in colloidal stability of latexes produced in the system in (a) deionized water; (b) 0.1M NaBr; 0.1 M NaBF$_4$; (d) 0.1M KPF$_6$.

Bulk polymerization of the b-Br/MMA/H$_2$O (0.07/0.07/0.86) microemulsion system resulted in polymer latexes without any apparent aggregation. Copolymerization between MMA and b-Br in microemulsions was confirmed by FTIR spectra (not shown here). FIG. 7 shows a transmission electron microscopy (TEM) image of the produced polymer latexes. The average diameter of these nanoparticles is about 30 nm. Since b-Br is more polar than MMA, it likely forms a polymerized polar shell around the resulting particles, which increases particle stability and allows the particles to be easily redispersed in water and in NaBr solution without any evident aggregation, indicating that the latex surface is hydrophilic. These latexes start to aggregate in NaBF$_4$ solution, and dramatically aggregate in KPF$_6$ solution. This sequence is illustrated in FIG. 8 where the latexes are stable in deionized water and in 0.1 M NaBr, but begin to aggregate in 0.1M NaBF$_4$ and aggregate strongly in 0.1M aqueous KPF$_6$. This aggregation is due to the surface being transformed from hydrophilic to hydrophobic, by anion exchange of the Br– to BF$_4^-$ to PF$_6^-$.

Materials Derived by Microemulsion Polymerization of Ionic Liquid Surfactant Stabilized Microemulsions

Example 13

Figure 9:
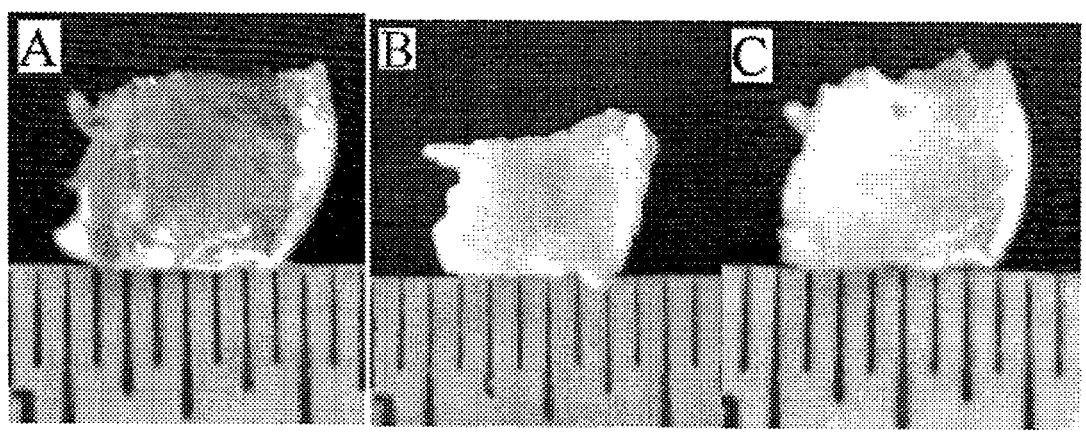
FIG. 9. Photographs of polymer gels: (A) after microemulsion polymerization; (B) gel in (A) treated with 0.1M KPF$_6$ solution; (C) gel in (B) treated with 0.1M NaBr solution.
Figure 10:
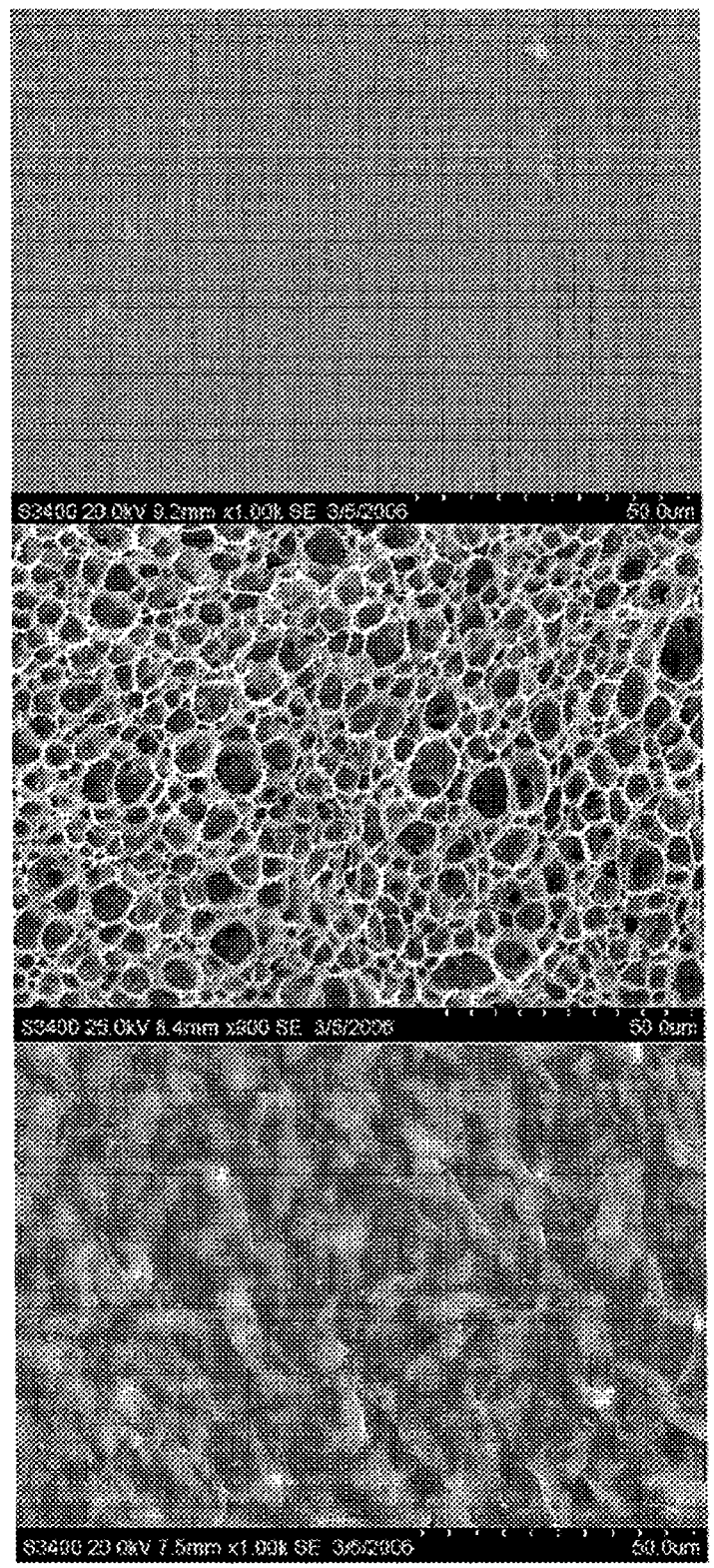
FIG. 10. Scanning electron micrographs of polymer gels: (top) after microemulsion polymerization; (middle) gel in (top) treated with 0.1M KPF$_6$ solution; (bottom) gel in (B) treated with 0.1M NaBr solution.

Transparent gels can be produced by polymerization when surfactant and MMA concentrations are higher. Bulk microemulsion polymerization in the b-Br/MMA/H$_2$O (0.15/0.10/0.75) system at 60° C. resulted in a transparent gel. A photograph of such a transparent polymer gel is illustrated in FIG. 9(A). and an SEM of the same gel (along a fracture surface) is illustrated in FIG. 10(top). Such a composition represents a new class of hydrogel.

Example 14

Such transparent gels shrink and become opaque after being immersed in aqueous 0.1M KPF$_6$, as shown in FIG. 9(B). Scanning electron microscopy (SEM) images of this material in FIG. 10(middle) show pores with diameters of about 3-8 μm. It can be seen that many of these pores are open cell indicating such a material is suitable for filtration and membrane applications.

Example 15

The microporous and opaque material of Example 14 can be converted back to a semi-transparent gel by further treatment with aqueous NaBr. The same sample pictured in FIG. 9(B) was soaked in 0.1M NaBr and nearly reversed to its original dimension and transparency, although some turbidity persisted. This material is illustrated in FIG. 9(C) and FIG. 10(bottom).

Example 16

In the a-BF$_4$/aqueous propanol/MMA system, a microemulsion consisting of a-BF$_4$ (15 wt %), MMA (15 wt %), 1-propanol (35 wt %), and H$_2$O (35 wt %) was initiated with AIBN (0.5% by weight relative to total monomer) at 60° C. Ethylene glycol dimethacrylate (EGDMA) as crosslinker (2 wt % based on the weight of MMA and surfactant a-BF$_4$) was added to the formulation. The transparent microemulsion was transformed into a transparent copolymer gel after thermally initiated polymerization. Gravimetric analysis of the 2% cross-linked sample indicated essentially complete conversion was obtained. FIG. 11(A) shows the transparent copolymer gel material obtained by polymerizing with 2% EGDMA in an NMR tube at 60° C. A SEM image of a fracture surface of this same sample is illustrated in FIG. 12(A), where we see essentially no structure, with the exception of indentations suggesting the possible onset of portion caused by the partial evaporation due to the operating vacuum in the SEM sample chamber.

Example 17

Figure 11:
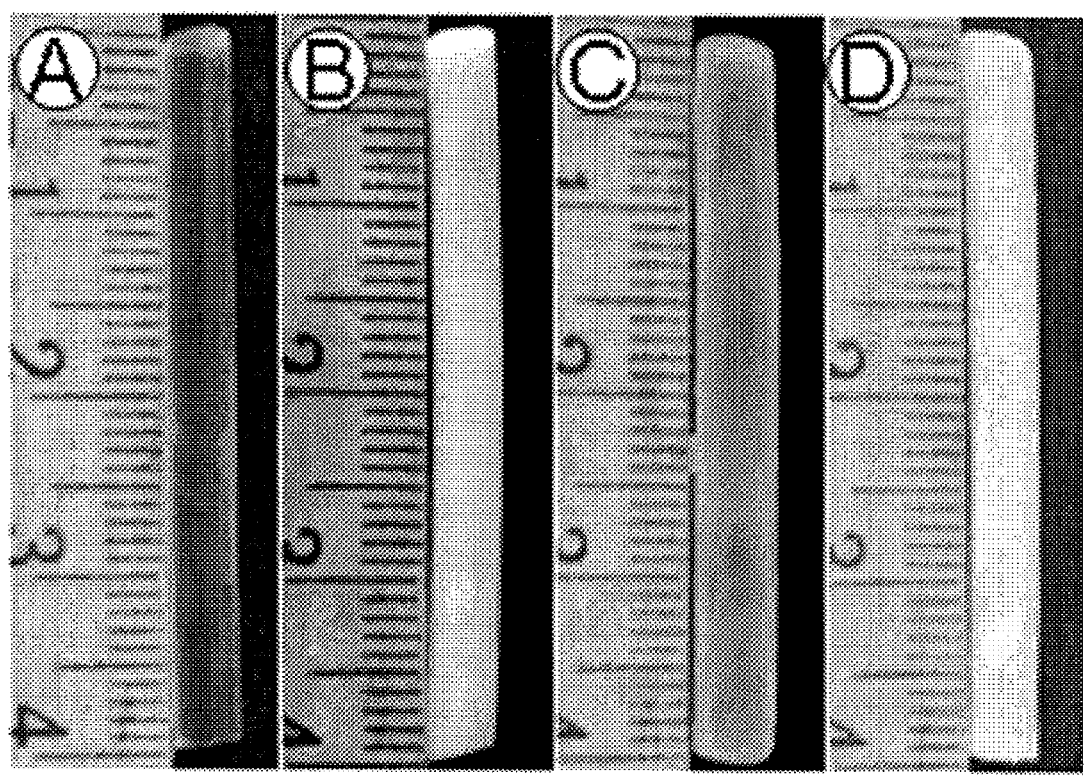
FIG. 11. Photographs of polymer rods: (A) after microemulsion polymerization (IL-BF$_4$, MMA, 1-propanol, H$_2$O at 15:15:35:35 weight ratio plus EGDMA at 2 wt % by weight with respect to other components); (B) gel in (A) treated with aqueous 0.1M KPF$_6$; (C) gel in (B) treated with water/DMSO solution (1:4 v/v); (D) recovered polymer gel in (C) treated with water.
Figure 12:
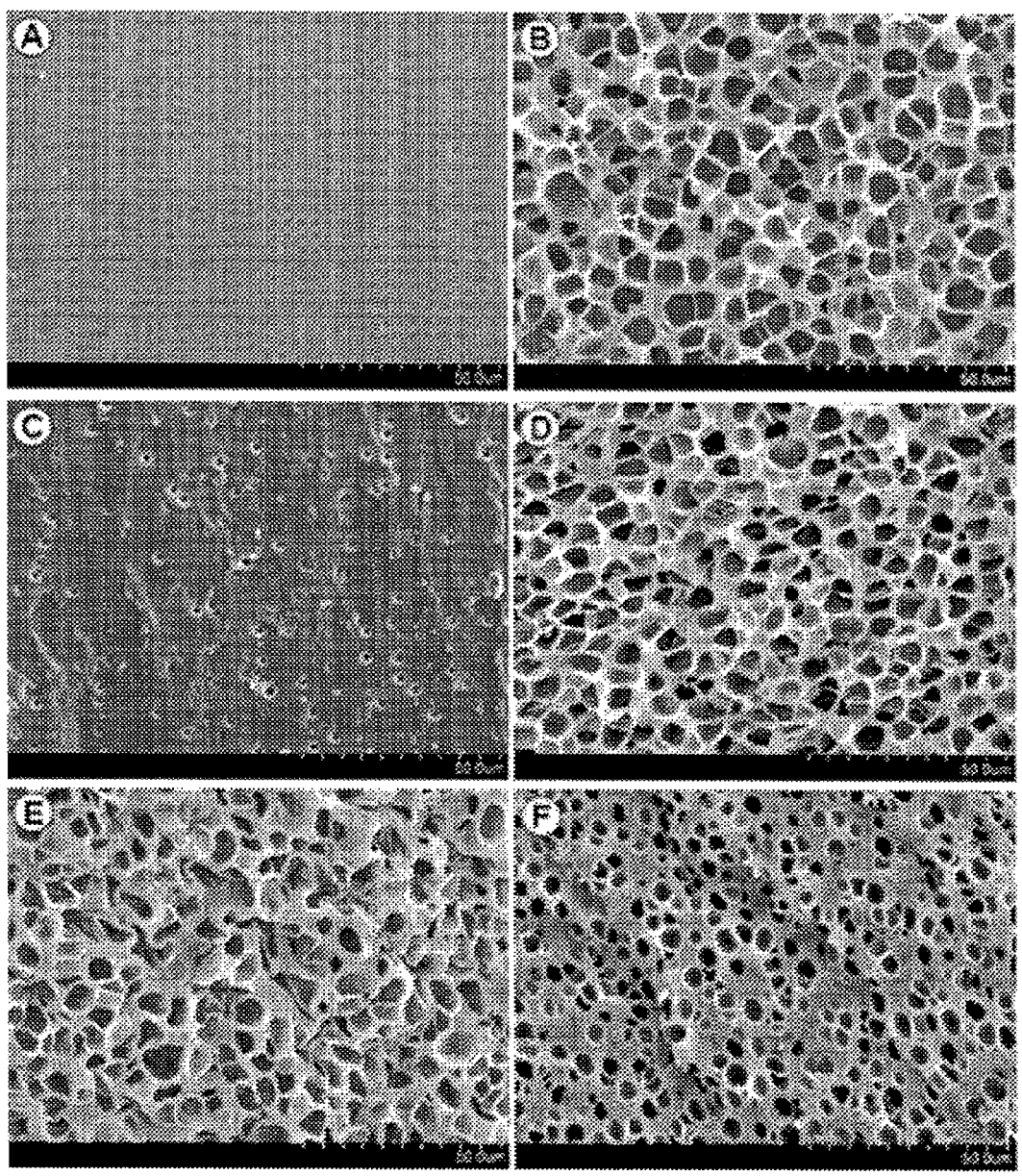
FIG. 12. SEM images of polymers: (A) after microemulsion polymerization (IL-BF$_4$, MMA, 1-propanol, H$_2$O at 15:15:35:35 weight ratio plus EGDMA at 2 wt % by weight with respect to other components); (B) gel in (A) treated with aqueous 0.1 M KPF$_6$; (C) gel in (B) treated with aqueous DMSO; (D) gel in (C) treated with water; (E) after 3 cyclic treatments of aqueous DMSO/water; (F) after 7 cyclic treatments of aqueous DMSO/water.

The transparent gel material of FIG. 11(A) and Example 16, became opaque after being immersed in water as shown in FIG. 11((B). FIG. 12(B) shows that this opaque material is porous, with both open cell and apparently closed cells evident in the sample.

Example 18

The opaque and porous material of Example 17 was converted back to a semi-transparent polymer gel by imbibing a 1:4 v/v mixture of water and dimethylsulfoxide (aqueous DMSO) solution as shown in FIG. 11(C). The SEM in FIG. 12(C) of this same sample shows essentially that all of the pores have closed, except some on the surface, due to the SEM chamber vacuum.

Example 19

When the solvogel sample of Example 18 was immersed in water again, the semi-transparent gel rod was re-converted to an opaque rod, as shown in FIG. 11(D); the accompanying porosity is illustrated in the SEM image in FIG. 12(D).

Example 20

When the porous and opaque rod of Example 19 was subjected to two more cycles of solvent shifting with aqueous DMSO to a semi-transparent rod and solvent shifting with water to an opaque rod, the porosity illustrated in FIG. 12(E) was obtained.

Example 21

When the porous and opaque rod of Example 20 was subject to four more cycles of solvent shifting with aqueous DMSO to a semi-transparent rod and solvent shifting with water to an opaque rod, the porosity illustrated in FIG. 12(F) was obtained.

Example 22

Figure 13:
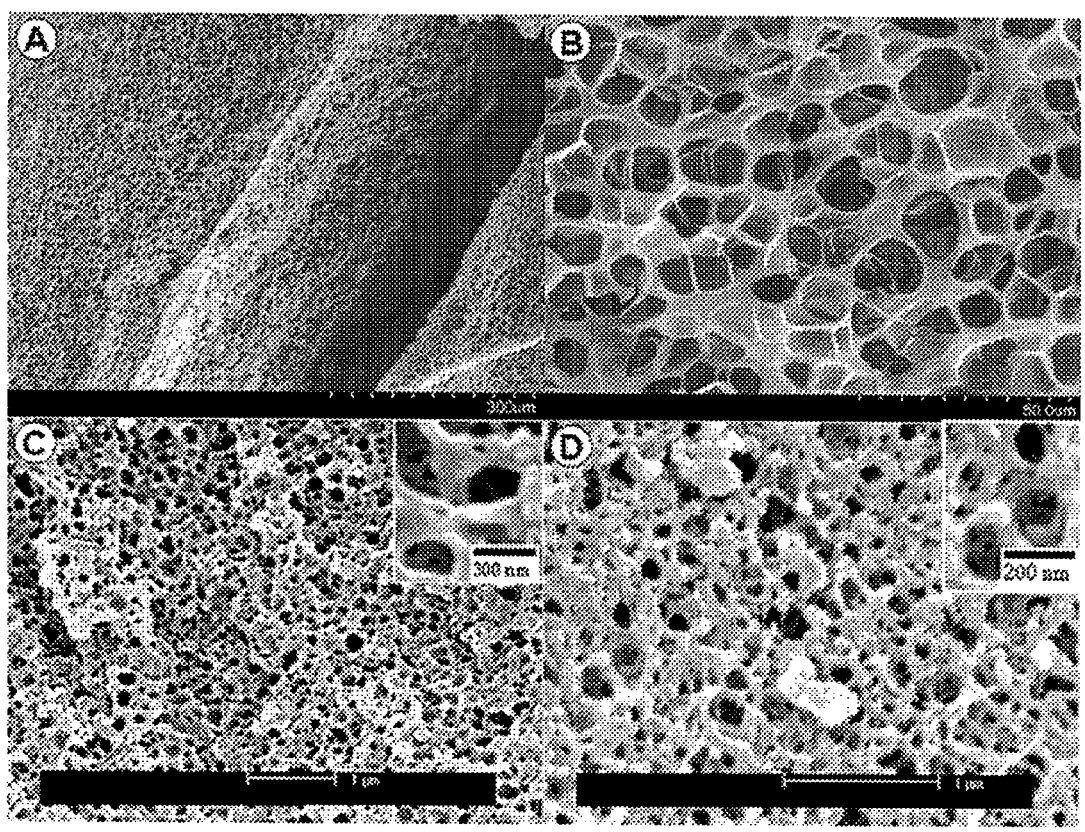
FIG. 13. SEM images of porous polymers synthesized with different crosslinker contents (A) and (B) EGDMA 1 wt %; (C) EGDMA 7 wt %; (D) EGDMA 10 wt %.

In the a-$BF_4$/aqueous propanol/MMA system, a microemulsion consisting of a-$BF_4$ (15 wt %), MMA (15 wt %), 1-propanol (35 wt %), and $H_2O$ (35 wt %) was initiated with AIBN (0.5% by weight relative to total monomer) at 60° C. Ethylene glycol dimethacrylate (EGDMA) as crosslinker (1 wt % based on the weight of MMA and surfactant a-$BF_4$) was added to the formulation. The transparent microemulsion was transformed into a transparent to translucent copolymer gel after the thermally initiated polymerization. This gel material was then placed in water, whereupon it became white and opaque. FIG. 13(a) and FIG. 13(b) illustrate the porous structure of this material at two different magnifications. It is evident that a combination of open cell and close cell structures was obtained.

Example 23

The preparative conditions of Example 22 were followed, except that 7% EGDMA was added to the microemulsion formulation rather than 1%. After the same microemulsion polymerization process and the same solvent shifting process, the nanoporous material illustrated in FIG. 13(C) was obtained. This figure, including the more highly magnified insert, show that a predominantly open cell nanoporous structure was obtained.

Example 24

The preparative conditions of Example 22 were followed, except that 10% EGDMA was added to the microemulsion formulation rather than 1%. After the same microemulsion polymerization process and the same solvent shifting process, the nanoporous material illustrated in FIG. 13(D) was obtained. This figure, including the more highly magnified insert, show that a predominantly open cell nanoporous structure was obtained.

Example 25

Figure 14:
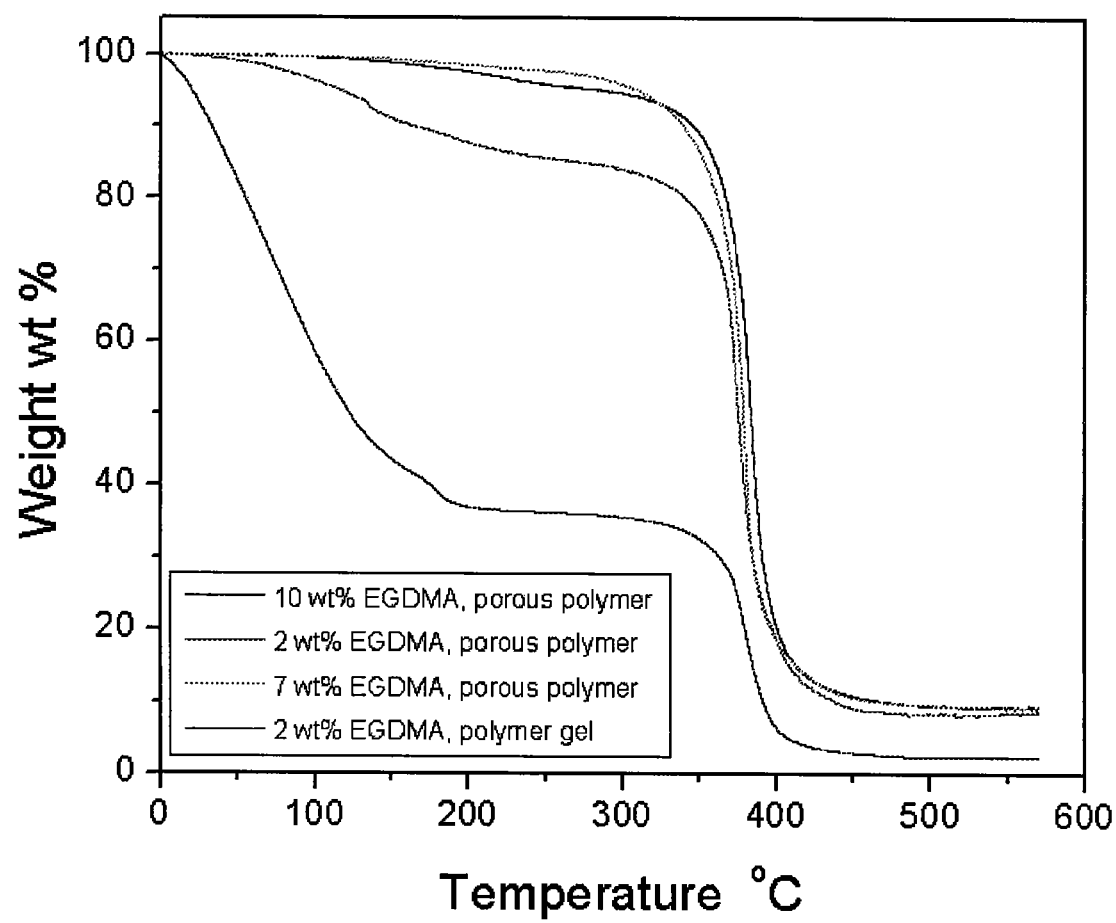
FIG. 14. TGA analysis of copoly(a-BF$_4$/MMA) samples with different crosslinker (EGDMA) contents and of a precursor polymer gel.

The microemulsion of Example 16, the porous material of Example 17, the nanoporous material of Example 23, and the nanoporous materials of Example 24 were thermally analyzed by thermogravimetric analysis from room temperature to 560° C. The degradation of these samples is illustrated in FIG. 14, and we see in each case that after removal of retained water, the resulting a-$BF_4$/MMA copolymer samples degrade at about 400° C., over 100° C. above the degradation temperature of polymethylmethacrylate (PMMA). This analysis shows that the ionic liquid surfactant-containing materials of the present invention have enhanced thermal stability and resistance to ignition.

Example 26

Figure 15:
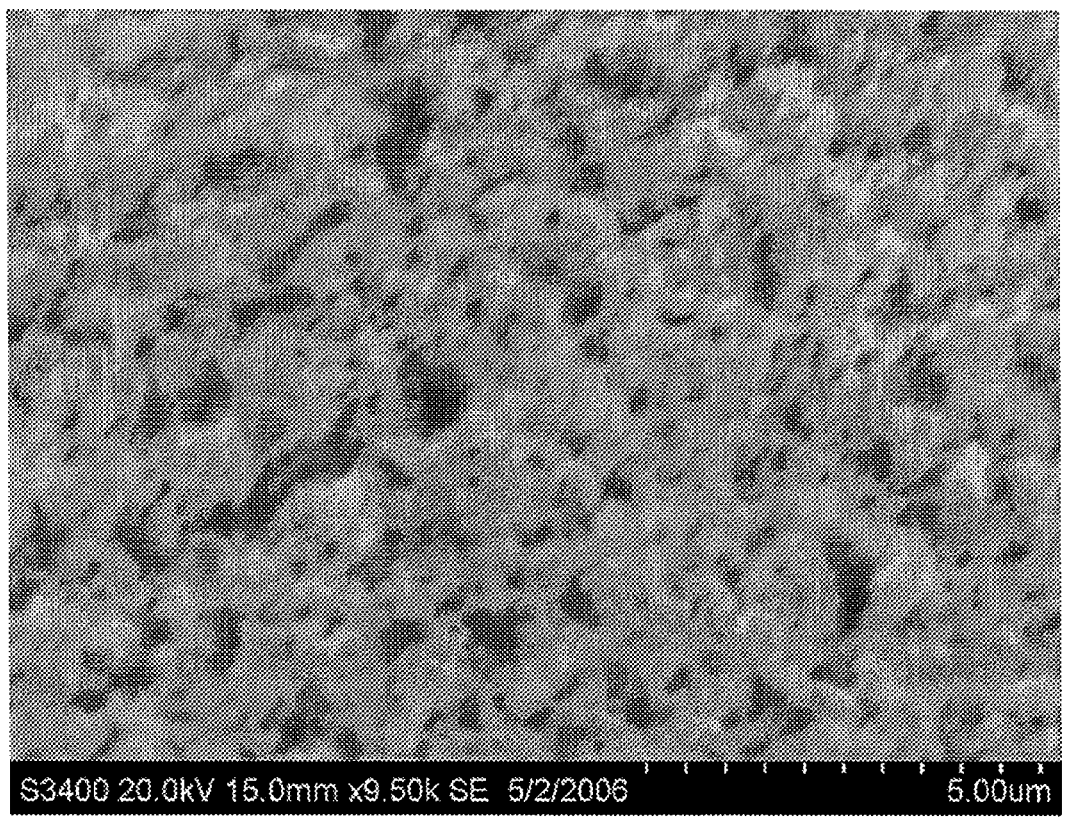
FIG. 15. SEM of nanoporous silica material of the present invention prepared by templating silica formation within a nanoporous copolymer of the present invention.

The nanoporous material of Example 24 was perfused with tetraethylorthosilicate (TEOS) and heated in the presence of dilute HCl to precipitate $SiO_2$ throughout the pore system of Example 27. This TEOS-perfused sample was then heated to 800° C. to pyrolyze away the templating organic/inorganic material to produce the templated nanoporous silica material illustrated in FIG. 15.

Example 27

Figure 16:
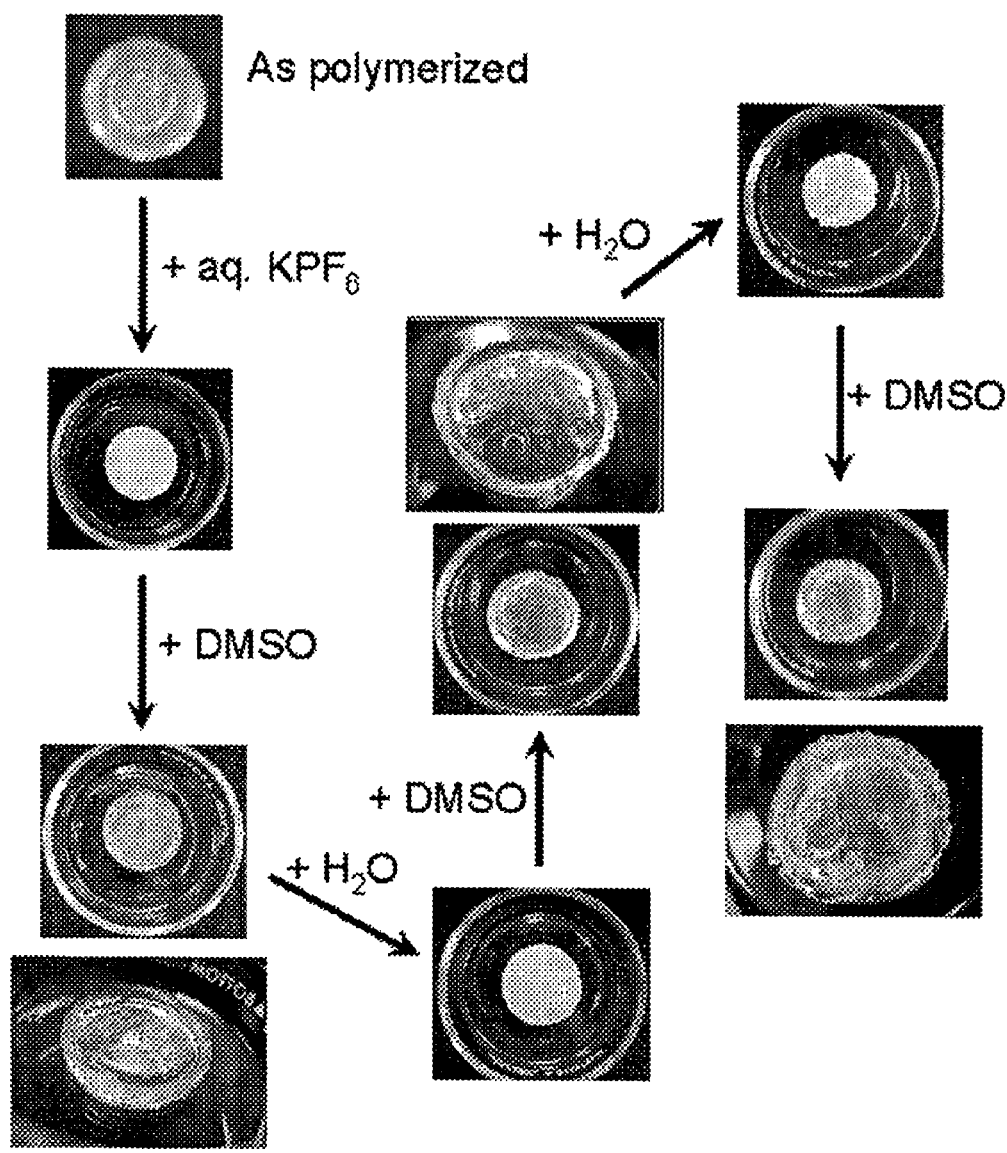
FIG. 16. Thick film of a-BF4/MMA copolymer gel of the present invention prepared by microemulsion polymerization and subsequent transformations induced by ion exchange and solvent shifting.

The reactive ionic liquid surfactant a-$BF_4$ was used to stabilize a microemulsion having the same composition as in Example 13. After adding AIBN initiator at 0.5% by weight of monomer the microemulsion was heat at 60° C. in a cuvette. When the viscosity began to thicken the polymerizing microemulsion was injected into a 2.2 cm inner diameter vial that had been purged with nitrogen, and the vial was placed in a 60° C. bath for several hours. The resulting nearly transparent gel slab, approximately 4 mm thick, was then photographed, as illustrated in FIG. 16.

Example 28

The gel material of Example 27 was then removed from the vial in which it was prepared by fracturing the vial. The gel slab was then placed in 0.1M $KPF_6$ solution. The slab quickly turned into an opaque disk. This disk was placed in a small Petri dish and photographed, as illustrated in FIG. 16.

Example 29

The opaque disk of Example 28 was then placed in DMSO. The opaque disk transformed back into a nearly transparent solvogel slab, as illustrated in FIG. 16 from normal and side perspectives.

Example 30

The solvogel material of Example 29 was then placed in deionized water. The slab quickly turned into an opaque disk. This disk was placed in a small Petri dish and photographed, as illustrated in FIG. 16.

Example 31

The opaque disk of Example 30 was then placed in DMSO. The opaque disk transformed back into a nearly transparent solvogel slab, as illustrated in FIG. 16 from normal and slightly off-normal perspectives.

Example 32

The solvogel material of Example 31 was then placed in deionized water. The slab quickly turned into an opaque disk. This disk was placed in a small Petri dish and photographed, as illustrated in FIG. 16.

Example 33

The opaque disk of Example 32 was then placed in DMSO. The opaque disk transformed back into a nearly transparent solvogel slab, as illustrated in FIG. 16 from two slightly different normal perspectives.

Example 34

Figure 17:
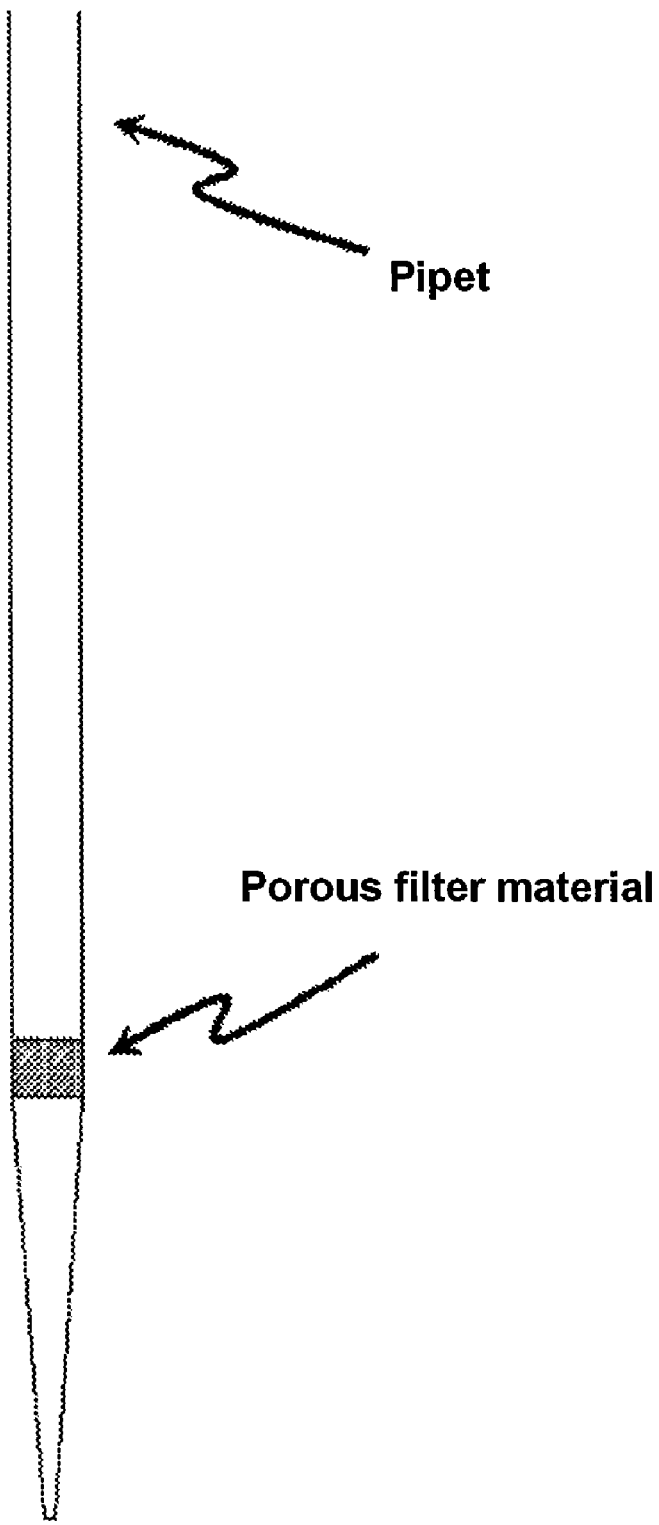
FIG. 17. Solvent-switchable filter of the present invention.

The solvogel material of Example 33 was placed in deionized water, and the slab converted again into an opaque and microporous disk. A cork boring machine was then used to bore a 4-5 mm diameter pellet out of the center of this opaque disk. This pellet was then placed in a Pasteur pipet, and with some pressure, the pellet was seated in the end of the pipet where the diameter begins to narrow. A diagram of the pipet is illustrated in FIG. 17. In order to get good seating of the porous pellet 25% DMSO in water was passed through the pellet, followed by 50% DMSO in water. This treatment caused the pellet to swell and to tightly seal inside the pipet. When pure DMSO was added the filter turned translucent and all flow stopped. When the DMSO was drained off and water was added, the filter transformed from a solvogel back to an open cell microporous material filter membrane. When DMSO was next added, the membrane transformed back to a solvogel, and fluid flow ceased. Then, when water was again added, the solvogel transformed back to a microporous filter, readily passing water through the open cell microporous filter.

What is claimed is:

1. A composition comprising a microemulsion of an immiscible Class I fluid and a Class II fluid stabilized by a reactive ionic liquid surfactant, wherein the ionic liquid surfactant has a melting point of less than 80° C.; wherein the Class I fluid comprises water or a water-miscible solvent; wherein the ionic liquid surfactant is selected from the group consisting of

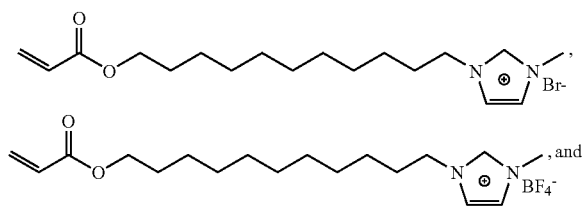

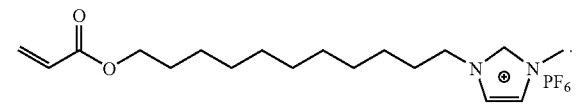

2. The composition of claim 1 wherein the melting point is less than 50° C.

3. The composition of claim 1 wherein the melting point is less than 30° C.

4. The composition of claim 1 wherein the Class I fluid comprises aqueous propanol.

5. The composition of claim 1 wherein the Class I fluid comprises a water miscible solvent selected from the group consisting of methanol, ethanol, t-butanol, s-butanol, n-butanol, n-pentanol, dimethylsulfoxide, tetrahydrofuran, dimethyl formamide, dimethylacetamide, and methyl acetamide.

6. The composition of claim 1 wherein the Class I fluid further comprises secondary components that are reactive monomers that are soluble in water and water-miscible polar solvents having the general structure I, $$CH_2=C(X)Y \qquad (I)$$

wherein X is a H, halogen, or alkyl of 1 to 6 carbons and Y is an acyl acid, ester, or amide.

7. The composition of claim 6 wherein X is H.

8. The composition of claim 6 wherein Y is —$CO_2H$, —$CO_2M$, where M is an alkali or other cation, —$CO_2E$, where E is a methyl, ethyl, ethylhydroxide, —$(CH_2O)_nH$ with n=2-10, —$(CH_2CH_2O)_nH$ with n=2-20, —$CONH_2$, or —CONHZ, where Z is methyl, ethyl, ethylhydroxide, —$(CH_2O)_nH$ with n=2-10, or —$(CH_2CH_2O)_nH$ with n=2-20.

9. The composition of claim 1 wherein the Class II fluid comprises primary components that include reactive monomers having structure II, $$CH_2=C(X)Y—Z \qquad (II)$$

wherein X is a H, halogen, or alkyl of 1 to 6 carbons and Y—Z is an acyl acid, ester, or amide or Y is a bond or linking group connected to an alkyl or aryl group.

10. The composition of claim 9 wherein X is H or methyl.

11. The composition of claim 9 wherein Y is a single bond, —O—, —CO—, —$CO_2$—, —$SO_2$—, —CON(R)—, —$SO_2N(R)$—, —N(R)CON(R)—, —N(R)$CO_2$—, —$COCH_2CH_2$—, —$OCOCH_2CH_2$—, —N(R)$COCH_2CH_2$—, —$OSO_2CH_2CH_2$—, —$SO_2CH_2CH_2$—, wherein R is a H or alkyl of 1 to 6 carbons, and Z is a H, linear or branched alkyl of 1 to 10 carbon atoms, or aryl of 1 to 10 carbon atoms.

12. The composition of claim 9 wherein the Class II fluid comprises a water-immiscible organic solvent.

13. The composition of claim 1 wherein the Class I fluid comprises ethylene glycol, propylene glycol, or glycerol.

14. The composition of claim 1 further comprising a crosslinking monomer.

15. The composition of claim 1 further comprising ethyleneglycol dimethacrylate.

16. The composition of claim 1 further comprising A-$(OCH_2CH_2)_n$O-A, where A is acryl and n=1-20.

17. A composite material comprising:
    a copolymer of ethylenically reactive species, wherein one of the species is a reactive ionic liquid surfactant having a melting point of less than 80° C. selected from the group consisting of

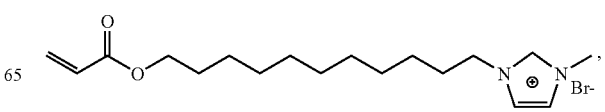

-continued

[Structure: acrylate-O-(CH2)n-imidazolium BF4⁻, and]

[Structure: acrylate-O-(CH2)n-imidazolium PF6⁻; and]

a non-reactive Class I fluid comprising water or a water-miscible solvent,
wherein the composite material is a suspension of latex particles comprising the copolymer.

18. The composite material of claim 17 wherein the melting point is less than 50° C.

19. The composite material of claim 17 wherein the melting point is less than 30° C.

20. The composite material of claim 17 wherein the Class I fluid comprises a water miscible solvent selected from the group consisting of methanol, ethanol, t-butanol, s-butanol, n-butanol, n-pentanol, dimethylsulfoxide, tetrahydrofuran, dimethyl formamide, dimethylacetamide, and methyl acetamide.

21. The composite material of claim 17 wherein the ethylenically reactive species is methylmethacrylate.

22. The composite material of claim 17 wherein the Class I fluid comprises secondary components that are reactive monomers that are soluble in water and water-miscible polar solvents having the general structure I, $$CH_2=C(X)Y \quad (I)$$

wherein X is a H, halogen, or alkyl of 1 to 6 carbons and Y is an acyl acid, ester, or amide.

23. The composite material of claim 22 wherein X is H.

24. The composite material of claim 22 wherein Y is —$CO_2H$, —$CO_2M$, where M is an alkali or other cation, —$CO_2E$, where E is a methyl, ethyl, ethylhydroxide, —$(CH_2O)_nH$ with n=2-10, —$(CH_2CH_2O)_nH$ with n=2-20, —$CONH_2$, or —CONHZ, where Z is a methyl, ethyl, ethylhydroxide, —$(CH_2O)_nH$ with n=2-10, —$(CH_2CH_2O)_nH$ with n=2-20.

25. The composite material of claim 17 wherein the ethylenically reactive species comprise primary components that include reactive monomers having structure II, $$CH_2=C(X)Y-Z \quad (II)$$

wherein X is H, halogen, or alkyl of 1 to 6 carbons and Y—Z is acyl acid, ester, or amide or Y is a bond or linking group connected to an alkyl or aryl group.

26. The composite material of claim 25 wherein X is H or methyl.

27. The composite material of claim 25 wherein Y is a single bond, —O—, —CO—, —$CO_2$—, —$SO_2$—, —CON(R)—, —$SO_2N(R)$—, —N(R)CON(R)—, —N(R)$CO_2$—, —$COCH_2$—, —$OCOCH_2CH_2$—, —N(R)$COCH_2CH_2$—, —$OSO_2CH_2CH_2$—, —$SO_2CH_2CH_2$—, wherein R is a H or alkyl of 1 to 6 carbons, and Z is a H, linear or branched alkyl of 1 to 10 carbon atoms, or aryl of 1 to 10 carbon atoms.

28. The composite material of claim 17 wherein the latex particles have a diameter less than 50 nm.

29. The composite material of claim 17, wherein the non-reactive Class I fluid is a water-miscible polar solvent.

30. The composite material of claim 17, wherein the non-reactive Class I fluid is an aqueous solution of a water miscible organic solvent.

31. The composite material of claim 30, wherein the aqueous solution is 50% or more water by weight.

32. A method of synthesizing a composite material comprising preparing a microemulsion of an immiscible Class I fluid and a Class II fluid stabilized by a reactive ionic liquid surfactant, wherein the ionic liquid surfactant has a melting point of less than 80° C.; wherein the Class I fluid comprises water or a water-miscible solvent; wherein the ionic liquid surfactant is selected from the group consisting of

[Structure: acrylate-O-(CH2)n-imidazolium Br⁻,]

[Structure: acrylate-O-(CH2)n-imidazolium BF4⁻, and]

[Structure: acrylate-O-(CH2)n-imidazolium PF6⁻,]

and polymerizing the microemulsion to form a composite material.

33. The method of claim 32 wherein the Class I fluid is a mixture of water and water-miscible solvent.

34. The method of claim 32 wherein the Class I fluid is a mixture of water and n-propanol.

35. The method of claim 32 wherein the Class II fluid is methylmethacrylate.

36. The method of claim 32 wherein the Class II fluid comprises a cross-linking monomer.

37. The method of claim 32 wherein the Class II fluid comprises ethyleneglycol dimethacrylate.

38. The method of claim 32 further comprising:
treating the composite material with an ion exchange treatment to form an ion exchanged material.

39. The method of claim 32 further comprising:
treating the composite material with a solvent shifting treatment to form a solvent shifted material.

40. The method of claim 38 further comprising:
treating the ion exchanged material with a solvent shifting treatment to form a solvent shifted material.

41. The method of claim 32 further comprising:
treating the composite material with a templating treatment to form an advanced composite material.

42. The method of claim 38 further comprising:
treating the ion exchanged material with a templating treatment to form an advanced composite material.

43. The method of claim 39 further comprising:
treating the solvent shifted material with a templating treatment to form an advanced composite material.

44. The method of claim 40 further comprising:
treating the solvent shifted material with a templated treatment to form an advanced composite material.

45. The method of claim 38 wherein the ion exchange treatment comprises ion exchange with $KPF_6$.

46. The method of claim 32 wherein the composite material is a latex suspension of nanoparticles.

47. The method of claim 46 wherein the nanoparticles are less than 50 nm in diameter.

48. The method of claim 32 wherein the melting point is less than 50° C.

49. The method of claim 32 wherein the melting point is less than 30° C.

50. The method of claim 32 wherein the Class I fluid comprises a water miscible solvent selected from the group consisting of methanol, ethanol, t-butanol, s-butanol, n-butanol, n-pentanol, dimethylsulfoxide, tetrahydrofuran, dimethyl formamide, dimethylacetamide, and methyl acetamide.

51. The method of claim 32 wherein the Class I fluid further comprises secondary components that are reactive monomers that are soluble in water and water-miscible polar solvents having the general structure I, $$CH_2=C(X)Y \qquad (I)$$

wherein X is a H, halogen, or alkyl of 1 to 6 carbons and Y is an acyl acid, ester, or amide.

52. The method of claim 51 wherein X is H.

53. The method of claim 51 wherein Y is —$CO_2H$, —$CO_2M$, where M is an alkali or other cation, —$CO_2E$, where E is a methyl, ethyl, ethylhydroxide, —$(CH_2O)_nH$ with n=2-10, —$(CH_2CH_2O)_nH$ with n=2-20, —$CONH_2$, or —CONHZ, where Z is a methyl, ethyl, ethylhydroxide, —$(CH_2O)_nH$ with n=2-10, —$(CH_2CH_2O)_nH$ with n=2-20.

54. The method of claim 32 wherein the Class II fluid comprises primary components that include reactive monomers having structure II, $$CH_2=C(X)Y-Z \qquad (II)$$

wherein X is a H, halogen, or alkyl of 1 to 6 carbons and Y—Z is an acyl acid, ester, or amide or Y is a bond or linking group connected to an alkyl or aryl group.

55. The method of claim 54 wherein X is H or methyl.

56. The method of claim 54 wherein Y is a single bond, —O—, —CO—, —$CO_2$—, —$SO_2$—, —CON(R)—, —$SO_2$N(R)—, —N(R)CON(R)—, —N(R)$CO_2$—, —$COCH_2CH_2$—, —$OCOCH_2CH_2$—, —N(R)$COCH_2CH_2$—, —$OSO_2CH_2CH_2$—, —$SO_2CH_2CH_2$—, wherein R is H or alkyl of 1 to 6 carbons, and Z is a H, linear or branched alkyl of 1 to 10 carbon atoms, or aryl of 1 to 10 carbon atoms.

57. The method of claim 32 wherein the Class II fluid comprises a water-immiscible organic solvent.

58. The method of claim 32 wherein the Class I fluid comprises ethylene glycol, propylene glycol, or glycerol.

59. The method of claim 32 wherein the microemulsion further comprises a cross-linking monomer.

60. The method of claim 59 wherein the cross-linking monomer comprises ethyleneglycol dimethacrylate.

61. The method of claim 59 wherein the cross-linking monomer comprises A-(OCH$_2$CH$_2$)$_n$O-A, where A is acryl and n=1-20.

62. A composite material comprising:
a copolymer of ethylenically reactive species, wherein one of the species is a reactive ionic liquid surfactant having a melting point of less than 80° C. selected from the group consisting of

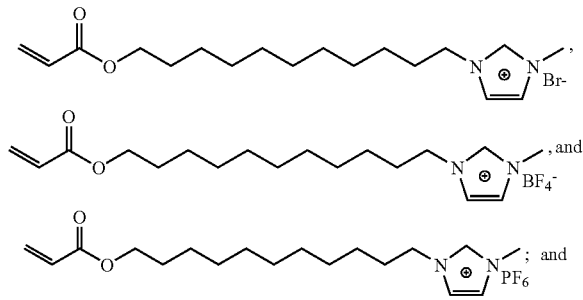

a non-reactive Class I fluid comprising water or a water-miscible solvent,
wherein the composite material is a solvogel comprising the copolymer.

63. The composite material of claim 62, wherein the solvogel is an open cell porous material.

* * * * *